(12) United States Patent
Pham et al.

(10) Patent No.: US 8,459,053 B2
(45) Date of Patent: Jun. 11, 2013

(54) VARIABLE SPEED COMPRESSOR PROTECTION SYSTEM AND METHOD

(75) Inventors: Hung M. Pham, Dayton, OH (US); Stephen M. Seibel, Celina, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 657 days.

(21) Appl. No.: 12/246,959

(22) Filed: Oct. 7, 2008

(65) Prior Publication Data

US 2009/0090118 A1    Apr. 9, 2009

Related U.S. Application Data

(60) Provisional application No. 60/978,258, filed on Oct. 8, 2007.

(51) Int. Cl.
    *F25B 1/00*    (2006.01)
(52) U.S. Cl.
    USPC .......................................... 62/228.5; 62/208
(58) Field of Classification Search
    USPC ............. 62/208–210, 222, 226, 228.4, 228.5, 62/230
    See application file for complete search history.

(56) References Cited

U.S. PATENT DOCUMENTS

| | | | |
|---|---|---|---|
| 2,883,255 A | 4/1959 | Anderson | |
| 2,981,076 A | 4/1961 | Gaugler | |
| 3,082,609 A * | 3/1963 | Ryan et al. | 62/89 |
| 3,242,321 A | 3/1966 | Chope | |
| 3,600,657 A | 8/1971 | Pfaff et al. | |
| 4,130,997 A | 12/1978 | Hara et al. | |
| 4,280,910 A | 7/1981 | Baumann | |
| 4,370,564 A | 1/1983 | Matsushita | |
| 4,460,861 A | 7/1984 | Rosa | |
| 4,461,153 A | 7/1984 | Lindner et al. | |
| 4,527,399 A | 7/1985 | Lord | |
| 4,653,280 A | 3/1987 | Hansen et al. | |
| 4,750,338 A | 6/1988 | Hingst | |
| 4,940,929 A | 7/1990 | Williams | |
| 5,182,918 A | 2/1993 | Manz et al. | |
| 5,258,901 A | 11/1993 | Fraidlin | |
| 5,269,146 A | 12/1993 | Kerner | |

(Continued)

FOREIGN PATENT DOCUMENTS

CN        1697954 A        11/2005
CN        1987258 A        6/2007

(Continued)

OTHER PUBLICATIONS

Notice of Allowance and Fee(s) Due and Notice of Allowability regarding U.S. Appl. No. 12/244,528, dated Sep. 7, 2010.

(Continued)

*Primary Examiner* — Allen Flanigan
(74) *Attorney, Agent, or Firm* — Harness, Dickey & Pierce, P.L.C.

(57) ABSTRACT

A system and method for a compressor may include an inverter drive connected to the compressor that receives electric power and modulates a speed of the compressor by modulating a frequency of the electric power. A control module connected to the inverter drive monitors compressor power data and compressor speed data from the inverter drive, and calculates a saturated condenser temperature of a refrigeration system associated with the compressor based on the compressor power data and the compressor speed data.

16 Claims, 17 Drawing Sheets

U.S. PATENT DOCUMENTS

| | | | |
|---|---|---|---|
| 5,291,115 | A | 3/1994 | Ehsani |
| 5,315,214 | A | 5/1994 | Lesea |
| 5,359,276 | A | 10/1994 | Mammano |
| 5,359,281 | A | 10/1994 | Barrow et al. |
| 5,410,221 | A | 4/1995 | Mattas et al. |
| 5,410,235 | A | 4/1995 | Ehsani |
| 5,440,218 | A | 8/1995 | Oldenkamp |
| 5,502,970 | A | 4/1996 | Rajendran |
| 5,519,300 | A | 5/1996 | Leon et al. |
| 5,603,222 | A | 2/1997 | Dube |
| 5,646,499 | A | 7/1997 | Doyama et al. |
| 5,663,627 | A | 9/1997 | Ogawa |
| 5,712,551 | A | 1/1998 | Lee |
| 5,742,103 | A | 4/1998 | Ashok |
| 5,786,992 | A | 7/1998 | Vinciarelli et al. |
| 5,903,138 | A | 5/1999 | Hwang et al. |
| 5,960,207 | A | 9/1999 | Brown |
| 5,963,442 | A | 10/1999 | Yoshida et al. |
| 6,005,365 | A | 12/1999 | Kaneko et al. |
| 6,028,406 | A | 2/2000 | Birk |
| 6,035,653 | A | 3/2000 | Itoh et al. |
| 6,041,609 | A | 3/2000 | Hornsleth et al. |
| 6,065,298 | A | 5/2000 | Fujimoto |
| 6,073,457 | A | 6/2000 | Kampf et al. |
| 6,091,215 | A | 7/2000 | Lovett et al. |
| 6,091,233 | A | 7/2000 | Hwang et al. |
| 6,102,665 | A | 8/2000 | Centers et al. |
| 6,116,040 | A | 9/2000 | Stark |
| 6,222,746 | B1 | 4/2001 | Kim |
| 6,226,998 | B1 | 5/2001 | Reason et al. |
| 6,236,183 | B1 | 5/2001 | Schroeder |
| 6,236,193 | B1 | 5/2001 | Paul |
| 6,259,614 | B1 | 7/2001 | Ribarich et al. |
| 6,281,656 | B1 | 8/2001 | Masaki et al. |
| 6,281,658 | B1 | 8/2001 | Han et al. |
| 6,316,918 | B1 | 11/2001 | Underwood et al. |
| 6,326,750 | B1 | 12/2001 | Marcinkiewicz |
| 6,344,725 | B2 | 2/2002 | Kaitani et al. |
| 6,373,200 | B1 | 4/2002 | Nerone et al. |
| 6,396,229 | B1 | 5/2002 | Sakamoto et al. |
| 6,404,154 | B2 | 6/2002 | Marcinkiewicz et al. |
| 6,406,265 | B1 | 6/2002 | Hahn et al. |
| 6,414,462 | B2 | 7/2002 | Chong |
| 6,462,492 | B1 | 10/2002 | Sakamoto et al. |
| 6,471,486 | B1 | 10/2002 | Centers et al. |
| 6,523,361 | B2 | 2/2003 | Higashiyama |
| 6,532,754 | B2 | 3/2003 | Haley et al. |
| 6,583,593 | B2 | 6/2003 | Iijima et al. |
| 6,636,011 | B2 | 10/2003 | Sadasivam et al. |
| 6,670,784 | B2 | 12/2003 | Odachi et al. |
| 6,688,124 | B1 | 2/2004 | Stark et al. |
| 6,698,217 | B2 * | 3/2004 | Tanimoto et al. ............... 62/175 |
| 6,708,507 | B1 | 3/2004 | Sem et al. |
| 6,714,425 | B2 | 3/2004 | Yamada et al. |
| 6,735,284 | B2 | 5/2004 | Cheong et al. |
| 6,749,404 | B2 | 6/2004 | Gennami et al. |
| 6,753,670 | B2 | 6/2004 | Kadah |
| 6,756,753 | B1 | 6/2004 | Marcinkiewicz |
| 6,756,757 | B2 | 6/2004 | Marcinkiewicz et al. |
| 6,758,050 | B2 | 7/2004 | Jayanth et al. |
| 6,767,851 | B1 | 7/2004 | Rokman et al. |
| 6,788,024 | B2 | 9/2004 | Kaneko et al. |
| 6,815,925 | B2 | 11/2004 | Chen et al. |
| 6,825,637 | B2 | 11/2004 | Kinpara et al. |
| 6,828,751 | B2 | 12/2004 | Sadasivam et al. |
| 6,831,439 | B2 | 12/2004 | Won et al. |
| 6,876,171 | B2 | 4/2005 | Lee |
| 6,915,646 | B2 | 7/2005 | Kadle et al. |
| 6,955,039 | B2 | 10/2005 | Nomura et al. |
| 6,966,759 | B2 | 11/2005 | Hahn et al. |
| 6,967,851 | B2 | 11/2005 | Yang et al. |
| 6,982,533 | B2 | 1/2006 | Seibel et al. |
| 6,984,948 | B2 | 1/2006 | Nakata et al. |
| 7,005,829 | B2 | 2/2006 | Schnetzka |
| 7,049,774 | B2 | 5/2006 | Chin et al. |
| 7,095,208 | B2 | 8/2006 | Kawaji et al. |
| 7,138,777 | B2 | 11/2006 | Won et al. |
| 7,154,237 | B2 | 12/2006 | Welchko et al. |
| 7,176,644 | B2 | 2/2007 | Ueda et al. |
| 7,184,902 | B2 | 2/2007 | El-Ibiary |
| 7,208,895 | B2 | 4/2007 | Marcinkiewicz et al. |
| 7,234,305 | B2 | 6/2007 | Nomura et al. |
| 7,272,018 | B2 | 9/2007 | Yamada et al. |
| 7,307,401 | B2 | 12/2007 | Gataric et al. |
| 7,342,379 | B2 | 3/2008 | Marcinkiewicz et al. |
| 7,375,485 | B2 | 5/2008 | Shahi et al. |
| 7,458,223 | B2 | 12/2008 | Pham |
| 7,554,271 | B2 | 6/2009 | Thiery et al. |
| 7,580,272 | B2 | 8/2009 | Taguchi et al. |
| 7,595,613 | B2 | 9/2009 | Thompson et al. |
| 7,605,570 | B2 | 10/2009 | Liu et al. |
| 7,613,018 | B2 | 11/2009 | Lim et al. |
| 7,660,139 | B2 | 2/2010 | Garabandic |
| 7,667,986 | B2 | 2/2010 | Artusi et al. |
| 7,675,759 | B2 | 3/2010 | Artusi et al. |
| 7,683,568 | B2 | 3/2010 | Pande et al. |
| 7,688,608 | B2 | 3/2010 | Oettinger et al. |
| 7,723,964 | B2 | 5/2010 | Taguchi |
| 7,733,678 | B1 | 6/2010 | Notohamiprodjo et al. |
| 7,738,228 | B2 | 6/2010 | Taylor |
| 7,782,033 | B2 | 8/2010 | Turchi et al. |
| 7,821,237 | B2 | 10/2010 | Melanson |
| 7,895,003 | B2 | 2/2011 | Caillat |
| 2001/0022939 | A1 | 9/2001 | Morita et al. |
| 2002/0047635 | A1 | 4/2002 | Ribarich et al. |
| 2002/0062656 | A1 | 5/2002 | Suitou et al. |
| 2002/0108384 | A1 | 8/2002 | Higashiyama |
| 2002/0117989 | A1 | 8/2002 | Kawabata et al. |
| 2002/0157408 | A1 | 10/2002 | Egawa et al. |
| 2002/0162339 | A1 | 11/2002 | Harrison et al. |
| 2003/0019221 | A1 | 1/2003 | Rossi et al. |
| 2003/0085621 | A1 | 5/2003 | Potega |
| 2003/0094004 | A1 | 5/2003 | Pham et al. |
| 2003/0146290 | A1 | 8/2003 | Wang et al. |
| 2003/0182956 | A1 | 10/2003 | Kurita et al. |
| 2004/0011020 | A1 | 1/2004 | Nomura et al. |
| 2004/0061472 | A1 | 4/2004 | Won et al. |
| 2004/0070364 | A1 | 4/2004 | Cheong et al. |
| 2004/0085785 | A1 | 5/2004 | Taimela |
| 2004/0100221 | A1 | 5/2004 | Fu |
| 2004/0119434 | A1 | 6/2004 | Dadd |
| 2004/0183491 | A1 | 9/2004 | Sidey |
| 2004/0221594 | A1 | 11/2004 | Suzuki et al. |
| 2004/0261448 | A1 | 12/2004 | Nishijima et al. |
| 2005/0047179 | A1 | 3/2005 | Lesea |
| 2005/0204760 | A1 | 9/2005 | Kurita et al. |
| 2005/0235660 | A1 | 10/2005 | Pham |
| 2005/0235662 | A1 | 10/2005 | Pham |
| 2005/0235663 | A1 | 10/2005 | Pham |
| 2005/0247073 | A1 | 11/2005 | Hikawa et al. |
| 2005/0262849 | A1 | 12/2005 | Nomura et al. |
| 2005/0270814 | A1 | 12/2005 | Oh |
| 2006/0041335 | A9 | 2/2006 | Rossi et al. |
| 2006/0042276 | A1 | 3/2006 | Doll et al. |
| 2006/0048530 | A1 | 3/2006 | Jun et al. |
| 2006/0056210 | A1 | 3/2006 | Yamada et al. |
| 2006/0090490 | A1 | 5/2006 | Grimm et al. |
| 2006/0117773 | A1 | 6/2006 | Street et al. |
| 2006/0123809 | A1 | 6/2006 | Ha et al. |
| 2006/0150651 | A1 | 7/2006 | Goto et al. |
| 2006/0158912 | A1 | 7/2006 | Wu et al. |
| 2006/0185373 | A1 | 8/2006 | Butler et al. |
| 2006/0187693 | A1 | 8/2006 | Tang |
| 2006/0198172 | A1 | 9/2006 | Wood |
| 2006/0198744 | A1 | 9/2006 | Lifson et al. |
| 2006/0247895 | A1 | 11/2006 | Jayanth |
| 2006/0255772 | A1 | 11/2006 | Chen |
| 2006/0261830 | A1 | 11/2006 | Taylor |
| 2006/0290302 | A1 | 12/2006 | Marcinkiewicz et al. |
| 2007/0012052 | A1 | 1/2007 | Butler et al. |
| 2007/0029987 | A1 | 2/2007 | Li |
| 2007/0040524 | A1 | 2/2007 | Sarlioglu et al. |
| 2007/0040534 | A1 | 2/2007 | Ghosh et al. |
| 2007/0089424 | A1 | 4/2007 | Venkataramani et al. |
| 2007/0118307 | A1 | 5/2007 | El-Ibiary |
| 2007/0118308 | A1 | 5/2007 | El-Ibiary |
| 2007/0132437 | A1 | 6/2007 | Scollo et al. |

| | | | |
|---|---|---|---|
| 2007/0144354 A1 | 6/2007 | Muller et al. | |
| 2008/0089792 A1 | 4/2008 | Bae et al. | |
| 2008/0112823 A1 | 5/2008 | Yoshida et al. | |
| 2008/0143289 A1 | 6/2008 | Marcinkiewicz et al. | |
| 2008/0160840 A1 | 7/2008 | Bax et al. | |
| 2008/0209925 A1 | 9/2008 | Pham | |
| 2008/0216494 A1 | 9/2008 | Pham et al. | |
| 2008/0252269 A1 | 10/2008 | Feldtkeller et al. | |
| 2008/0265847 A1 | 10/2008 | Woo et al. | |
| 2008/0272745 A1 | 11/2008 | Melanson | |
| 2008/0272747 A1 | 11/2008 | Melanson | |
| 2008/0273356 A1 | 11/2008 | Melanson | |
| 2008/0284399 A1 | 11/2008 | Oettinger et al. | |
| 2008/0285318 A1 | 11/2008 | Tan et al. | |
| 2009/0015214 A1 | 1/2009 | Chen | |
| 2009/0015225 A1 | 1/2009 | Turchi et al. | |
| 2009/0016087 A1 | 1/2009 | Shimizu | |
| 2009/0033296 A1 | 2/2009 | Hammerstrom | |
| 2009/0039852 A1 | 2/2009 | Fishelov et al. | |
| 2009/0059625 A1 | 3/2009 | Viitanen et al. | |
| 2009/0071175 A1 | 3/2009 | Pham | |
| 2009/0091961 A1 | 4/2009 | Hsia et al. | |
| 2009/0094997 A1 | 4/2009 | McSweeney | |
| 2009/0140680 A1 | 6/2009 | Park | |
| 2009/0237963 A1 | 9/2009 | Prasad et al. | |
| 2009/0243561 A1 | 10/2009 | Tan et al. | |
| 2009/0273330 A1 | 11/2009 | Sisson | |
| 2009/0290395 A1 | 11/2009 | Osaka | |
| 2009/0295347 A1 | 12/2009 | Popescu et al. | |
| 2009/0303765 A1 | 12/2009 | Shimizu et al. | |
| 2009/0316454 A1 | 12/2009 | Colbeck et al. | |
| 2010/0007317 A1 | 1/2010 | Yang | |
| 2010/0014326 A1 | 1/2010 | Gu et al. | |
| 2010/0014329 A1 | 1/2010 | Zhang et al. | |
| 2010/0052601 A1 | 3/2010 | Pummer | |
| 2010/0052641 A1 | 3/2010 | Popescu et al. | |
| 2010/0079125 A1 | 4/2010 | Melanson et al. | |
| 2010/0080026 A1 | 4/2010 | Zhang | |
| 2010/0109615 A1 | 5/2010 | Hwang et al. | |
| 2010/0109626 A1 | 5/2010 | Chen | |
| 2010/0118571 A1 | 5/2010 | Saint-Pierre | |
| 2010/0118576 A1 | 5/2010 | Osaka | |
| 2010/0128503 A1 | 5/2010 | Liu et al. | |
| 2010/0156377 A1 | 6/2010 | Siegler | |
| 2010/0165683 A1 | 7/2010 | Sugawara | |
| 2010/0181930 A1 | 7/2010 | Hopwood et al. | |
| 2010/0187914 A1 | 7/2010 | Rada et al. | |
| 2010/0202169 A1 | 8/2010 | Gaboury et al. | |
| 2010/0226149 A1 | 9/2010 | Masumoto | |
| 2010/0246220 A1 | 9/2010 | Irving et al. | |
| 2010/0246226 A1 | 9/2010 | Ku et al. | |
| 2010/0253307 A1 | 10/2010 | Chen et al. | |
| 2010/0259230 A1 | 10/2010 | Boothroyd | |
| 2010/0270984 A1 | 10/2010 | Park et al. | |
| 2011/0138826 A1 | 6/2011 | Lifson et al. | |

FOREIGN PATENT DOCUMENTS

| | | | |
|---|---|---|---|
| JP | 55155134 A | 12/1980 | |
| JP | 61272483 A | 12/1986 | |
| JP | 01167556 | 7/1989 | |
| JP | 2004163 A | 1/1990 | |
| JP | 03129255 A | 6/1991 | |
| JP | 04344073 A | 11/1992 | |
| JP | 07035393 A | 2/1995 | |
| JP | 09196524 A | 7/1997 | |
| JP | 1998097331 | 4/1998 | |
| JP | 10153353 A | 6/1998 | |
| JP | 10160271 | 6/1998 | |
| JP | H10-153353 | 6/1998 | |
| JP | 11159895 A | 6/1999 | |
| JP | 11287497 A | 10/1999 | |
| JP | 2000297970 A | 10/2000 | |
| JP | 2001317470 A | 11/2001 | |
| JP | 2002013858 A | 1/2002 | |
| JP | 2002243246 A | 8/2002 | |
| JP | 2003156244 | 5/2003 | |
| JP | 2004135491 A | 4/2004 | |
| JP | 2005-003710 A | 1/2005 | |
| JP | 2005132167 A | 5/2005 | |
| JP | 2005282972 A | 10/2005 | |
| JP | 2006177214 A | 7/2006 | |
| JP | 2006188954 | 7/2006 | |
| JP | 2006233820 | 9/2006 | |
| JP | 2007198230 A | 8/2007 | |
| JP | 2007198705 A | 8/2007 | |
| KR | 10-1996-0024115 | 7/1996 | |
| KR | 2001-0044273 A | 6/2001 | |
| KR | 2003-0011415 A | 2/2003 | |
| KR | 2005-0059842 A | 6/2005 | |
| KR | 20050085544 A | 8/2005 | |
| KR | 20070071407 A | 7/2007 | |
| WO | 2004059822 A1 | 7/2004 | |
| WO | WO-2004083744 A1 | 9/2004 | |

OTHER PUBLICATIONS

Supplemental Notice of Allowability regarding U.S. Appl. No. 12/244,528, dated Dec. 17, 2010.
Non-Final Office Action regarding U.S. Appl. No. 12/246,825, dated Jan. 4, 2011.
Non-Final Office Action regarding U.S. Appl. No. 12/247,033, dated Jan. 21, 2011.
Non-Final Office Action regarding U.S. Appl. No. 12/247,001, dated Feb. 25, 2011.
Non-Final Office Action regarding U.S. Appl. No. 12/244,387, dated Mar. 3, 2011.
Notification of the First Office Action from the State Intelletual Property Office of People's Republic of China regarding Chinese Application No. 200880110551.6, dated Feb. 11, 2011. Translation provided by Unitalen Attorneys at Law.
International Search Report regarding International Application No. PCT/US2008/011576 dated Mar. 23, 2009.
Written Opinion of the International Searching Authority regarding International Application No. PCT/US2008/011576 dated Mar. 20, 2009.
International Search Report regarding International Application No. PCT/US2008/011464 dated Mar. 13, 2009.
Written Opinion of the International Searching Authority regarding International Application No. PCT/US2008/011464 dated Mar. 13, 2009.
Non-Final Office Action regarding U.S. Appl. No. 12/246,893, dated Apr. 1, 2011.
Notification of First Office Action from the State Intellectual Property Office of People's Republic of China regarding Chinese Patent Application No. 200880110665.0, dated Apr. 8, 2011. Translation provided by Unitalen Attorneys at Law.
International Preliminary Report on Patentability for International Application No. PCT/US2008/011442, dated Apr. 7, 2010.
International Preliminary Report on Patentability for International Application No. PCT/US2008/011596, dated Apr. 13, 2010.
International Preliminary Report on Patentability for International Application No. PCT/US2008/011441, dated Apr. 7, 2010.
International Preliminary Report on Patentability for International Application No. PCT/US2008/011570, dated Apr. 13, 2010.
International Preliminary Report on Patentability for International Application No. PCT/US2008/011464, dated Apr. 7, 2010.
International Preliminary Report on Patentability for International Application No. PCT/US2008/011593, dated Apr. 13, 2010.
International Preliminary Report on Patentability for International Application No. PCT/US2008/011597, dated Apr. 13, 2010.
International Preliminary Report on Patentability for International Application No. PCT/US2008/011590, dated Apr. 13, 2010.
International Preliminary Report on Patentability for International Application No. PCT/US2008/011589, dated Apr. 13, 2010.
International Preliminary Report on Patentability for International Application No. PCT/US2008/011576, dated Apr. 13, 2010.
International Search Report for International Application No. PCT/US2008/011442 dated Feb. 3, 2009.
International Search Report for International Applicatoin No. PCT/US2008/011596, dated Feb. 25, 2009.
International Search Report for International Application No. PCT/US2008/011441, dated Jan. 30, 2009.

International Search Report for International Application No. PCT/US2008/011570, dated May 26, 2009.
Written Opinion of the International Searching Authority for International Application No. PCT/US2008/011570, dated May 26, 2009.
Written Opinion of the International Searching Authority for International Application No. PCT/US2008/011593, dated Jun. 17, 2009.
International Search Report for International Application No. PCT/US2008/011593, dated Jun. 17, 2009.
Written Opinion of the International Searching Authority for International Application No. PCT/US2008/011597, dated Jun. 19, 2009.
International Search Report for International Application No. PCT/US2008/011597, dated Jun. 19, 2009.
International Search Report for International Application No. PCT/US2008/011590, dated Feb. 27, 2009.
International Search Report for International Application No. PCT/US2008/011589, dated Feb. 27, 2009.
Written Opinion of the International Searching Authority for International Application No. PCT/US2008/011442, dated Feb. 3, 2009.
Written Opinion of the International Searching Authority for International Application No. PCT/US2008/011596, dated Feb. 25, 2009.
Written Opinion of the International Searching Authority for International Application No. PCT/US2008/011441, dated Jan. 30, 2009.
Written Opinion of the International Searching Authority for International Application No. PCT/US2008/011589, dated Feb. 27, 2009.
Written Opinion of the International Searching Authority for International Application No. PCT/US2008/011590, dated Feb. 27, 2009.
Notice of Grounds for Rejection from the Korean Intellectual Property Office regarding Korean Patent Application No. 10-2010-7009374, dated May 31, 2011. Translation provided by Y.S. Change & Associates.
Final Office Action regarding U.S. Appl. No. 12/246,825, dated Jun. 14, 2011.
Final Office Action regarding U.S. Appl. No. 12/247,033, dated Jul. 12, 2011.
Office Action regarding U.S. Appl. No. 12/246,893, dated Aug. 1, 2011.
Final Office Action regarding U.S. Appl. No. 12/244,387, dated Aug. 17, 2011.
Final Office Action regarding U.S. Appl. No. 12/247,001, dated Sep. 1, 2011.
Office Action regarding U.S. Appl. No. 12/247,020, dated Sep. 1, 2011.
Office Action regarding U.S. Appl. No. 12/246,927, dated Sep. 6, 2011.
Appeal Brief regarding U.S. Appl. No. 12/247,001, dated Feb. 1, 2012.
Examiner's Answer to Appellant's Appeal Brief regarding U.S. Appl. No. 12/247,001, dated Mar. 26, 2012.
Notice of Appeal from the Examiner to the Board of Patent Appeals and Interferences and Pre-Appeal Brief Request for Review regarding U.S. Appl. No. 12/247,001, dated Dec. 1, 2011.
Notice of Panel Decision from Pre-Appeal Brief Review regarding U.S. Appl. No. 12/247,001, dated Dec. 27, 2011.
Notification of First Office Action from the State Intellectual Property Office of People's Republic of China regarding Chinese Patent Application No. 200880110590.6, dated Feb. 29, 2012. Translation provided by Unitalen Attorneys at Law.
Notification of Grounds for Refusal regarding Korean Patent Application No. 10-2010-7009659, dated Feb. 8, 2012. Translation provided by Y.S. Chang & Associates.
Office Action regarding U.S. Appl. No. 12/244,387, dated Mar. 1, 2012.
Office Action regarding U.S. Appl. No. 12/244,416, dated Aug. 8, 2011.
Non-Final Office Action regarding U.S. Appl. No. 12/247,033, dated Jan. 19, 2012.
Notice of Final Rejection from the Korean Intellectual Property Office regarding Korean Application 10-2010-7009374, dated Nov. 18, 2011. Translation provided by Y.S. Chang & Associates.
Notification of First Office action from the State Intellectual Property Office of People's Republic of China regarding Chinese Patent Application No. 200880110484.8, dated Dec. 23, 2011. Translation provided by Unitalen Attorneys at Law.
Notification of Grounds for Refusal regarding Korean Patent Application No. 10-2010-7007375, dated Dec. 7, 2011. Translation provided by Y.S. Chang & Associates.
Notification of Grounds for Refusal regarding Korean Patent Application No. 10-2010-7007581, dated Nov. 14, 2011. Translation provided by Y.S. Chang & Associates.
Notification of Grounds for Refusal regarding Korean Patent Application No. 10-2010-7007583 from the Korean Intellectual Property Office, dated Dec. 28, 2011. Translation provided by Y.S. Chang & Associates.
Notification of the First Office Action from the State Intellectual Property Office of People's Republic of China regarding Chinese Patent Application No. 200880111091.9 dated Nov. 23, 2011. Translation provided by Unitalen Attorneys at Law.
Office Action regarding U.S. Appl. No. 12/246,825, dated Oct. 12, 2011.
Office Action regarding U.S. Appl. No. 12/246,893, dated Dec. 7, 2011.
Final Office Action regarding U.S. Appl. No. 12/244,416, dated Nov. 15, 2011.
"Electrical Power vs Mechanical Power," by Suvo, http://www.brighthubengineering.com/machine-design/62310-electrical-power-vs-mechanical-power/; dated Jan. 25, 2010; 2 pages.
"Solving System of Equations by Substitution," by http://cstl.syr.edu/fipse/algebra/unit5/subst.htm, dated Aug. 30, 2012; 4 pages.
Applicant-Initiated Interview Summary regarding U.S. Appl. No. 12/246,927, dated Sep. 5, 2012.
Applicant-Initiated Interview Summary regarding U.S. Appl. No. 12/247,020, dated Sep. 6, 2012.
Final Office Action regarding U.S. Appl. No. 12/247,020, dated Jun. 6, 2012.
Final Office Action regarding U.S. Appl. No. 12/247,033, dated Jul. 5, 2012.
Non-Final Office Action regarding U.S. Appl. No. 12/246,927, dated Jun. 6, 2012.
Notification of First Office Action from the State Intellectual Property Office of People's Republic of China regarding Chinese Patent Application No. 200880110616.7, dated Jul. 4, 2012. Translation provided by Unitalen Attorneys at Law.
Notification of Grounds for Refusal regarding Korean Patent Application No. 10-2010-7006707, dated May 22, 2012. Translation provided by Y.S. Chang & Associates.
Notification of the First Office Action from the State Intellectual Property Office of People's Republic of China regarding Chinese Application No. 2008801110726, dated Jun. 5, 2012. Translation provided by Unitalen Attorneys at Law.
Notification of the Second Office Action from the State Intellectual Property Office of People's Republic of China regarding Chinese Patent Application No. 200880110665.0, dated Apr. 5, 2012. Translation provided by Unitalen Attorneys at Law.
Notice of Allowance and Fees Due regarding U.S. Appl. No. 12/247,020, dated Jan. 4, 2013.
Notice of Allowance and Fees Due regarding U.S. Appl. No. 12/246,927, dated Dec. 21, 2012.
Second Office Action from the State Intellectual Property Office of People's Republic of China regarding Chinese Patent Application No. 200880110785.0, dated Dec. 28, 2012. Translation provided by Unitalen Attorneys at Law.
Non-Final Office Action regarding U.S. Appl. No. 12/247,033, dated Jan. 29, 2013.

* cited by examiner

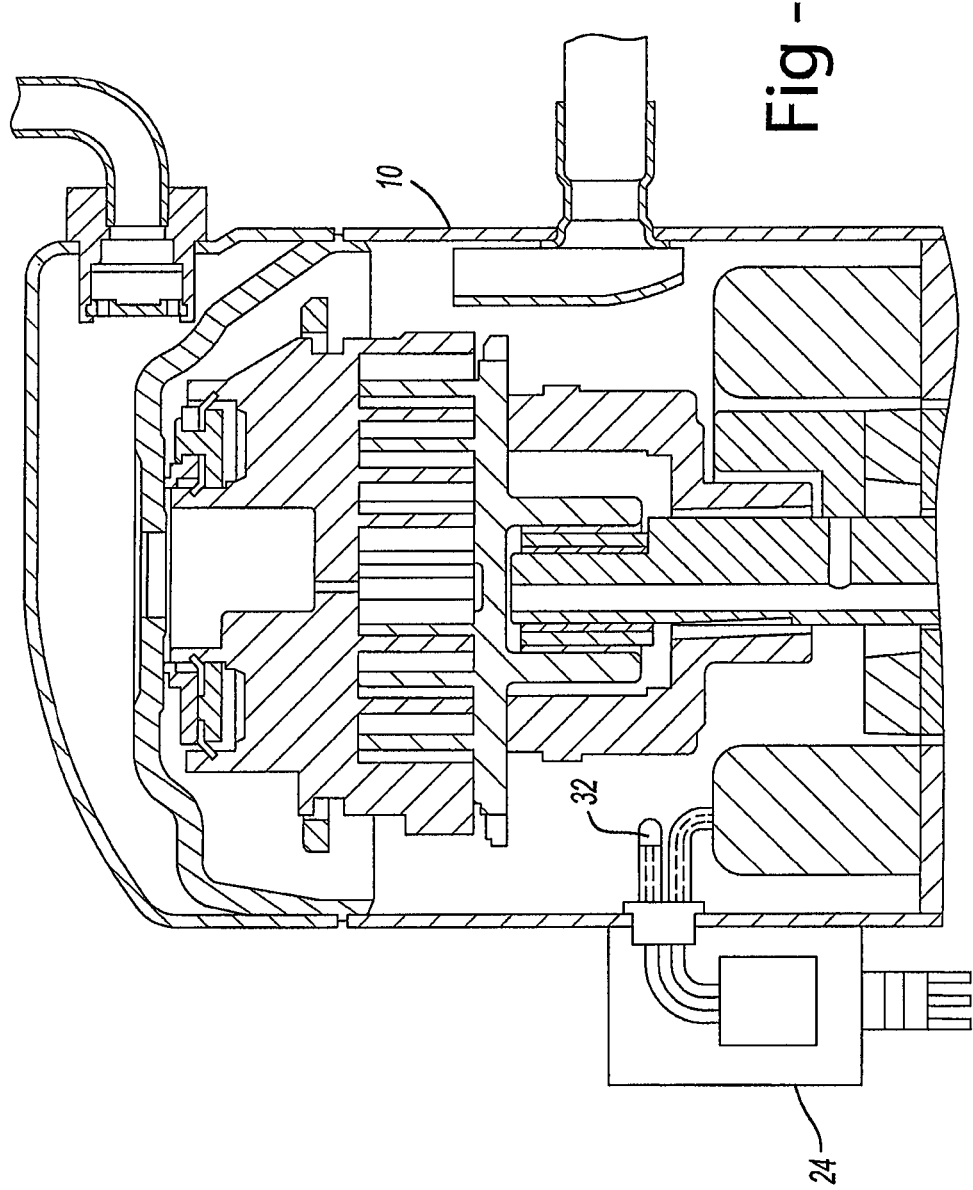

VARIABLE SPEED COMPRESSOR PROTECTION SYSTEM AND METHOD

CROSS-REFERENCE TO RELATED APPLICATIONS

This application claims the benefit of U.S. Provisional Application No. 60/978,258, filed on Oct. 8, 2007. The entire disclosure of the above application is incorporated herein by reference.

FIELD

The present disclosure relates to compressors, and more particularly, to a protection system for use with a variable speed compressor.

BACKGROUND

The statements in this section merely provide background information related to the present disclosure and may not constitute prior art.

Compressors may be used in a wide variety of industrial and residential applications to circulate refrigerant within a refrigeration, heat pump, HVAC, or chiller system (generically "refrigeration systems") to provide a desired heating or cooling effect. In any of the foregoing applications, the compressor should provide consistent and efficient operation to insure that the particular application (i.e., refrigeration, heat pump, HVAC, or chiller system) functions properly. A variable speed compressor may be used to vary compressor capacity according to refrigeration system load.

Operation of the compressor during a flood back condition is undesirable. A flood back condition occurs when excessive liquid refrigerant flows into the compressor. Severe flood back can dilute the oil and reduce its lubrication property, leading to potential seizure. Although some mixture of liquid refrigerant and oil in the compressor may be expected, excessive mixture may cause damage to the compressor.

Likewise, operation of the compressor at excessive temperature levels may be damaging to the compressor. An overheat condition may damage internal compressor components including, for example, the electric motor.

SUMMARY

A system is provided comprising a compressor, an inverter drive connected to the compressor that receives electric power and modulates a speed of the compressor by modulating a frequency of the electric power, a control module connected to the inverter drive that monitors compressor power data and compressor speed data from the inverter drive, and that calculates a saturated condenser temperature of a refrigeration system associated with the compressor based on the compressor power data and the compressor speed data.

In other features, a discharge temperature sensor may output a discharge temperature signal corresponding to a discharge temperature of refrigerant exiting the compressor, wherein the control module receives the discharge temperature signal and calculates a discharge superheat temperature associated with the compressor based on the discharge temperature signal and the saturated condenser temperature.

In other features, the control module may monitor at least one of an overheat condition and a flood back condition of the compressor based on the calculated discharge superheat temperature.

In other features, the control module may access compressor map data for the compressor, the compressor map data correlating power and speed data for the compressor with expected saturated condenser temperatures associated with the compressor, wherein the control module determines the saturated condenser temperature based on the compressor map data.

In other features, the control module may adjust at least one of the speed of the compressor and an expansion valve associated with the compressor based on the calculated discharge superheat temperature.

In other features, the control module may adjust the speed of the compressor and the expansion valve to maintain operation of the compressor within a predetermined operating envelope, the predetermined operating envelope including at least one of a maximum flood back limit, a maximum discharge superheat limit, a maximum discharge temperature limit, a minimum discharge superheat limit, a minimum discharge temperature limit, a maximum scroll temperature limit, and a maximum motor temperature limit.

In other features, the control module may calculate the saturated condenser temperature and a saturated evaporator temperature by performing multiple iterations of a first function and a second function, the first function associating the saturated condenser temperature with a compressor power, a compressor speed, and the saturated evaporator temperature, and the second function associating the saturated evaporator temperature with the discharge temperature, the compressor speed, and the saturated condenser temperature.

In other features, the control module may calculate at least one of a compressor capacity and a compressor efficiency of the compressor based on the saturated evaporator temperature, the saturated condenser temperature, and the compressor speed data.

A method is provided that may comprise delivering electric power to a compressor with an inverter drive configured to modulate a speed of the compressor by modulating a frequency of the electric power delivered to the compressor, monitoring compressor power data and compressor speed data from the inverter drive, calculating a saturated condenser temperature of a refrigeration system associated with the compressor based on the compressor power data and the compressor speed data.

In other features, the method may include receiving a discharge temperature signal from a discharge temperature sensor, the discharge temperature signal corresponding to a discharge temperature of refrigerant exiting the compressor and calculating a discharge superheat temperature associated with the compressor based on the discharge temperature signal and the saturated condenser temperature.

In other features, the method may include monitoring at least one of an overheat condition and a flood back condition of the compressor based on the calculated discharge superheat temperature.

In other features, the method may include accessing compressor map data for the compressor, the compressor map data correlating power and speed data for the compressor with expected saturated condenser temperatures associated with the compressor, wherein the saturated condenser temperature is calculated based on said compressor map data.

In other features, the method may include adjusting at least one of the speed of the compressor and an expansion valve associated with the compressor based on the calculated discharge superheat temperature.

In other features, the speed of the compressor and the expansion valve may be adjusted to maintain operation of the compressor within a predetermined operating envelope, the predetermined operating envelope including at least one of a maximum flood back limit, a maximum discharge superheat limit, a maximum discharge temperature limit, a minimum discharge superheat limit, a minimum discharge temperature limit, a maximum scroll temperature limit, and a maximum motor temperature limit.

In other features, the method may include calculating the saturated condenser temperature and a saturated evaporator temperature by performing multiple iterations of a first function and a second function, the first function associating the saturated condenser temperature with a compressor power, a compressor speed, and a saturated evaporator temperature, and the second function associating the saturated evaporator temperature with the discharge temperature, the compressor speed, and the saturated condenser temperature.

In other features, the method may include calculating at least one of a compressor capacity and a compressor efficiency of the compressor based on the saturated evaporator temperature, the saturated condenser temperature, and the compressor speed data.

A system may comprise a compressor, a suction temperature sensor that outputs a suction temperature signal corresponding to a temperature of refrigerant entering the compressor, an inverter drive connected to the compressor that receives electric power and modulates a speed of the compressor by modulating a frequency of the electric power, a heat sink temperature sensor that outputs a heat sink temperature signal corresponding to a temperature of a heat sink associated with the inverter, a control module connected to the inverter drive that receives the suction temperature signal, that monitors compressor power data and compressor speed data from the inverter drive, and that calculates at least one of a saturated evaporator temperature of a refrigeration system associated with the compressor, a mass flow of refrigerant in the refrigeration system, and a suction superheat associated with the compressor, based on the suction temperature signal, the heat sink temperature signal, the compressor power data, and the compressor speed data.

In other features, the suction temperature sensor may be located at an inlet of the compressor.

In other features, the suction temperature may be located at an inlet of the inverter drive.

In other features, the control module may calculate an inverter heat loss based on the compressor speed data and the compressor power data.

In other features, the control module may calculate the mass flow of the refrigerant based on the inverter heat loss, the suction temperature signal, and the heat sink temperature signal.

In other features, the control module may calculate the saturated evaporator temperature based on the compressor power data, the compressor speed data, and the mass flow.

In other features, the control module may calculate a suction superheat temperature based on the suction temperature signal and the saturated evaporator temperature.

In other features, the control module may monitor at least one of an overheat condition and a flood back condition of the compressor based on the calculated suction superheat temperature.

In other features, an ambient temperature sensor may output an ambient temperature signal corresponding to an ambient temperature, wherein the control module receives the ambient temperature signal and calculates a discharge superheat based on the ambient temperature signal and the calculated suction superheat temperature.

In other features, a method may include receiving a suction temperature signal from a suction temperature sensor, the suction temperature signal corresponding to a temperature of refrigerant entering a compressor, delivering electric power to the compressor with an inverter drive configured to modulate a speed of the compressor by modulating a frequency of the electric power, receiving a heat sink temperature signal from a heat sink temperature sensor, the heat sink temperature signal corresponding to a temperature of a heat sink associated with the inverter, monitoring compressor power data and compressor speed data from the inverter drive, calculating at least one of a saturated evaporator temperature of a refrigeration system associated with the compressor, a mass flow of refrigerant in the refrigeration system, and a suction superheat associated with the compressor, based on the suction temperature signal, the heat sink temperature signal, the compressor power data, and the compressor speed data.

In other features, the method may include calculating an inverter heat loss based on the compressor speed data and the compressor power data.

In other features, the method may include calculating the mass flow of the refrigerant based on the inverter heat loss, the suction temperature signal, and the heat sink temperature signal.

In other features, the method may include calculating the saturated evaporator temperature based on the compressor power data, the compressor speed data, and the mass flow.

In other features, the method may include calculating a suction superheat temperature based on the suction temperature signal and the saturated evaporator temperature.

In other features, the method may include monitoring at least one of an overheat condition and a flood back condition of the compressor based on the calculated suction superheat temperature.

In other features, the method may include receiving an ambient temperature signal from an ambient temperature sensor, the ambient temperature signal corresponding to an ambient temperature and calculating a discharge superheat based on the ambient temperature signal and the calculated suction superheat temperature.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 17 is a cross-section view of a compressor.

DETAILED DESCRIPTION

Figure 1:
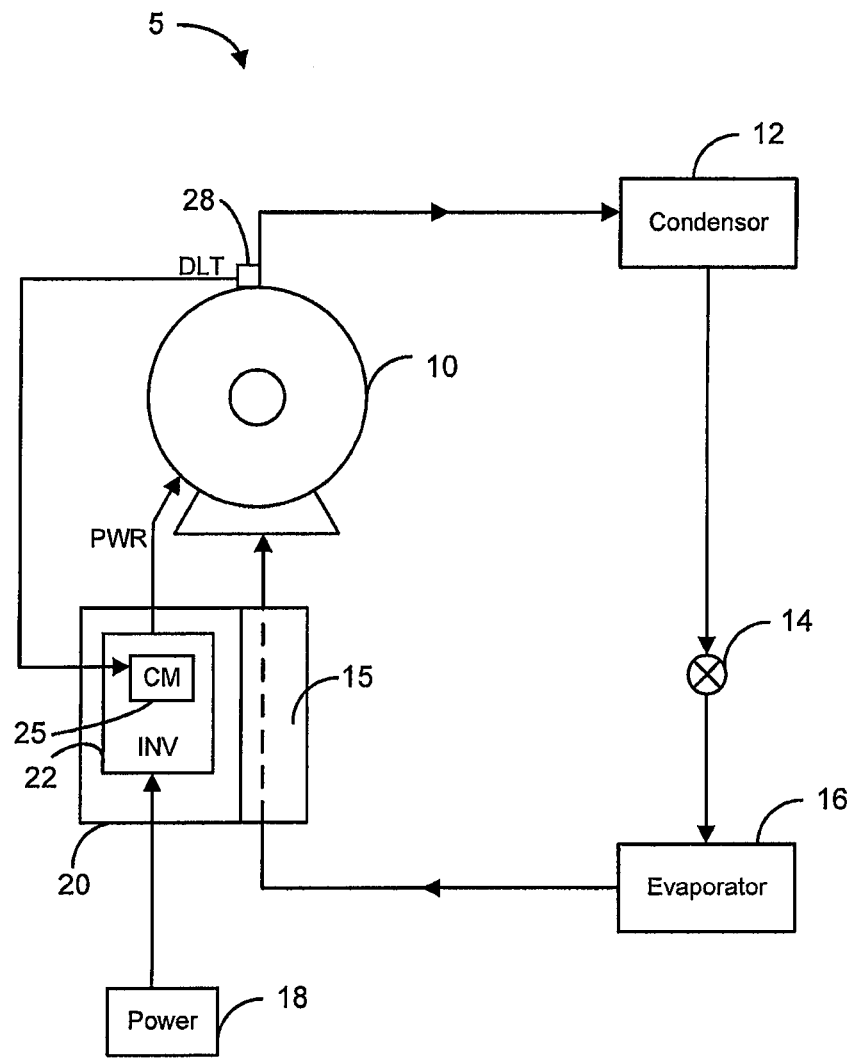
FIG. 1 is a schematic illustration of a refrigeration system.

The following description is merely exemplary in nature and is not intended to limit the present disclosure, application, or uses. It should be understood that throughout the drawings, corresponding reference numerals indicate like or corresponding parts and features.

As used herein, the terms module, control module, and controller may refer to one or more of the following: An application specific integrated circuit (ASIC), an electronic circuit, a processor (shared, dedicated, or group) and memory that execute one or more software or firmware programs, a combinational logic circuit, or other suitable components that provide the described functionality. As used herein, computer readable medium may refer to any medium capable of storing data for a computer or module, including a processor. Computer-readable medium includes, but is not limited to, memory, RAM, ROM, PROM, EPROM, EEPROM, flash memory, CD-ROM, floppy disk, magnetic tape, other magnetic medium, optical medium, or any other device or medium capable of storing data for a computer.

With reference to FIG. 1, an exemplary refrigeration system 5 includes a compressor 10 that compresses refrigerant vapor. While a specific refrigeration system is shown in FIG. 1, the present teachings are applicable to any refrigeration system, including heat pump, HVAC, and chiller systems. Refrigerant vapor from compressor 10 is delivered to a condenser 12 where the refrigerant vapor is liquefied at high pressure, thereby rejecting heat to the outside air. The liquid refrigerant exiting condenser 12 is delivered to an evaporator 16 through an expansion valve 14. Expansion valve 14 may be a mechanical or electronic valve for controlling super heat of the refrigerant. The refrigerant passes through expansion valve 14 where a pressure drop causes the high pressure liquid refrigerant to achieve a lower pressure combination of liquid and vapor. As hot air moves across evaporator 16, the low pressure liquid turns into gas, thereby removing heat from evaporator 16. The low pressure gas is again delivered to compressor 10 where it is compressed to a high pressure gas, and delivered to condenser 12 to start the refrigeration cycle again.

Figure 2:
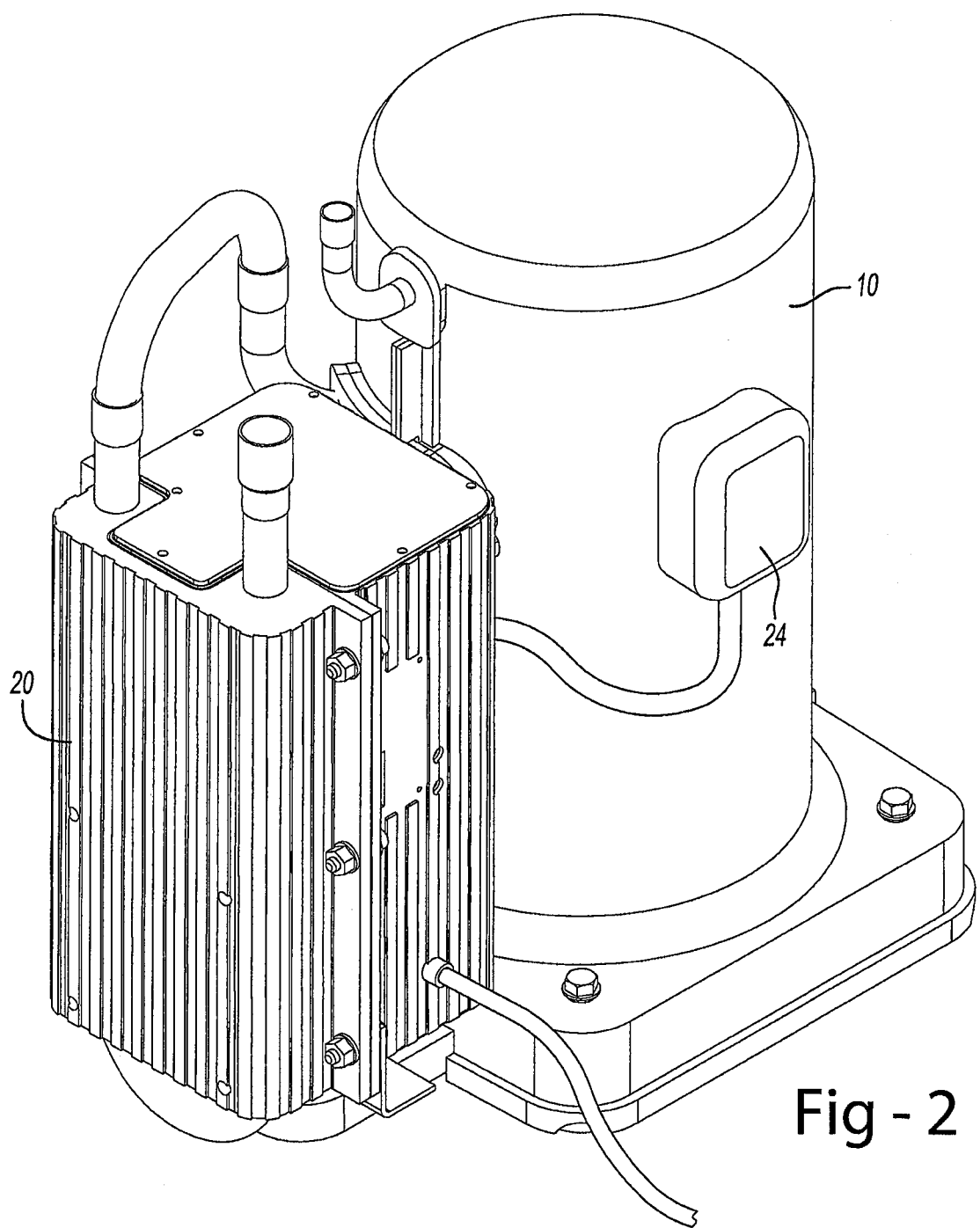
FIG. 2 is a perspective view of a compressor with an inverter drive.
Figure 3:
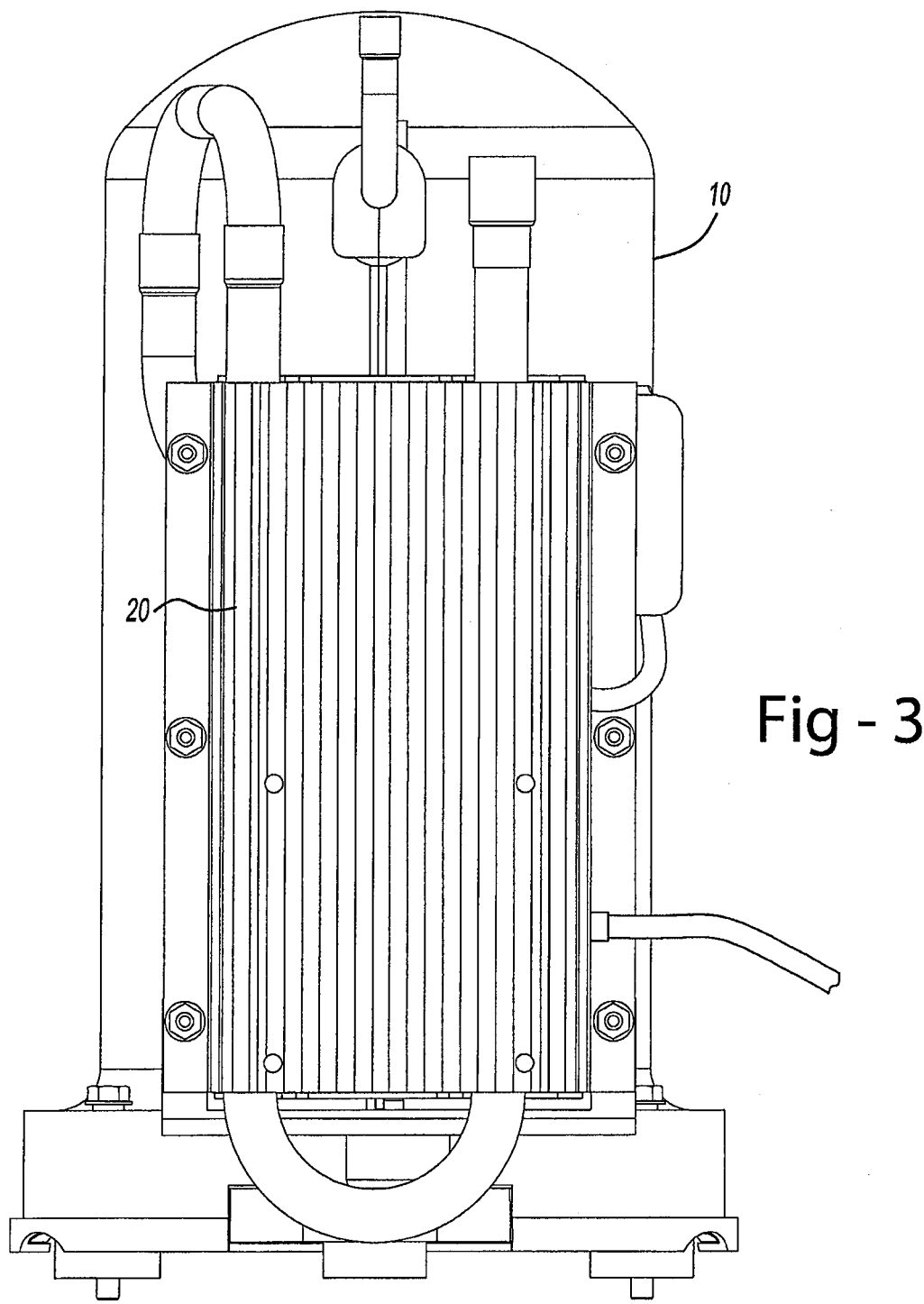
FIG. 3 is another perspective view of a compressor with an inverter driver.

With reference to FIGS. 1, 2 and 3, compressor 10 may be driven by an inverter drive 22, also referred to as a variable frequency drive (VFD), housed in an enclosure 20. Enclosure 20 may be near compressor 10. Inverter drive 22 receives electrical power from a power supply 18 and delivers electrical power to compressor 10. Inverter drive 22 includes a control module 25 with a processor and software operable to modulate and control the frequency of electrical power delivered to an electric motor of compressor 10. Control module 25 includes a computer readable medium for storing data including the software executed by the processor to modulate and control the frequency of electrical power delivered to the electric motor of compressor and the software necessary for control module 25 to execute and perform the protection and control algorithms of the present teachings. By modulating the frequency of electrical power delivered to the electric motor of compressor 10, control module 25 may thereby modulate and control the speed, and consequently the capacity, of compressor 10.

Inverter drive 22 includes solid state electronics to modulate the frequency of electrical power. Generally, inverter drive 22 converts the inputted electrical power from AC to DC, and then converts the electrical power from DC back to AC at a desired frequency. For example, inverter drive 22 may directly rectify electrical power with a full-wave rectifier bridge. Inverter driver 22 may then chop the electrical power using insulated gate bipolar transistors (IGBT's) or thyristors to achieve the desired frequency. Other suitable electronic components may be used to modulate the frequency of electrical power from power supply 18.

Electric motor speed of compressor 10 is controlled by the frequency of electrical power received from inverter driver 22. For example, when compressor 10 is driven at sixty hertz electric power, compressor 10 may operate at full capacity operation. When compressor 10 is driven at thirty hertz electric power, compressor 10 may operate at half capacity operation.

Piping from evaporator 16 to compressor 10 may be routed through enclosure 20 to cool the electronic components of inverter drive 22 within enclosure 20. Enclosure 20 may include a cold plate 15. Suction gas refrigerant may cool the cold plate prior to entering compressor 10 and thereby cool the electrical components of inverter drive 22. In this way, cold plate 15 may function as a heat exchanger between suction gas and inverter drive 22 such that heat from inverter drive 22 is transferred to suction gas prior to the suction gas entering compressor 10.

As shown in FIGS. 2 and 3, electric power from inverter drive 22 housed within enclosure 20 may be delivered to compressor 10 via a terminal box 24 attached to compressor 10.

A compressor floodback or overheat condition is undesirable and may cause damage to compressor 10 or other refrigeration system components. Suction super heat (SSH) and/or discharge super heat (DSH) may be correlated to a flood back or overheating condition of compressor 10 and may be monitored to detect and/or predict a flood back or overheating condition of compressor 10. DSH is the difference between the temperature of refrigerant vapor leaving the compressor, referred to as discharge line temperature (DLT) and the saturated condenser temperature (Tcond). Suction super heat (SSH) is the difference between the temperature of refrigerant vapor entering the compressor, referred to as suction line temperature (SLT) and saturated evaporator temperature (Tevap).

Figure 5:
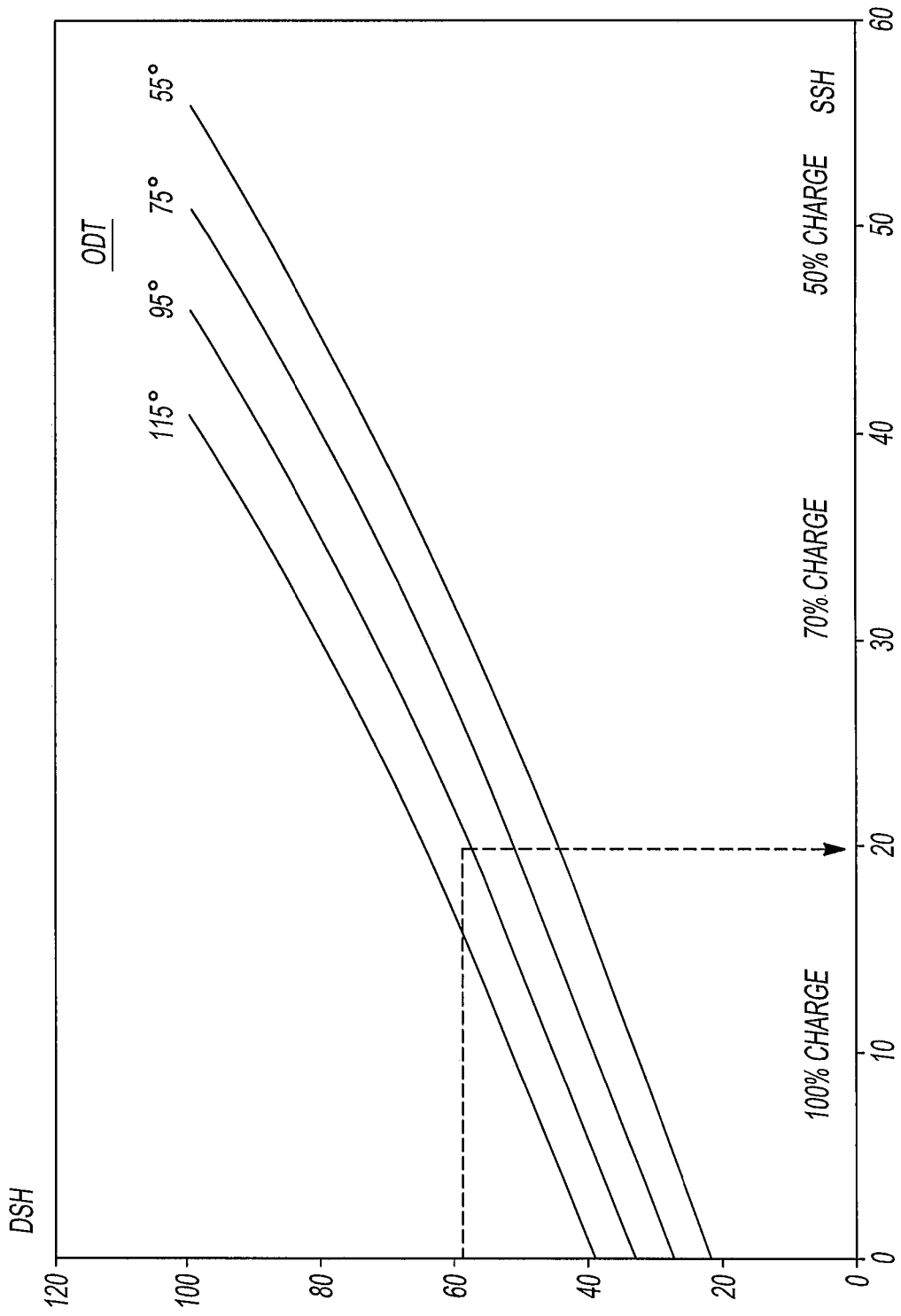
FIG. 5 is a graph showing discharge super heat correlated with suction super heat and outdoor temperature.

SSH and DSH may be correlated as shown in FIG. 5. The correlation between DSH and SSH may be particularly accurate for scroll type compressors, with outside ambient temperature being only a secondary effect. As shown in FIG. 5, correlations between DSH and SSH are shown for outdoor temperatures (ODT) of one-hundred fifteen degrees Fahrenheit, ninety-five degrees Fahrenheit, seventy-five degrees Fahrenheit, and fifty-five degrees Fahrenheit. The correlation shown in FIG. 5 is an example only and specific correlations for specific compressors may vary by compressor type, model, capacity, etc.

A flood back condition may occur when SSH is approaching zero degrees or when DSH is approaching twenty to forty degrees Fahrenheit. For this reason, DSH may be used to detect the onset of a flood back condition and its severity. When SSH is at zero degrees, SSH may not indicate the severity of the flood back condition. As the floodback condition becomes more severe, SSH remains at around zero degrees. When SSH is at zero degrees, however, DSH may be between twenty and forty degrees Fahrenheit and may more accurately indicate the severity of a flood back condition. When DSH is in the range of thirty degrees Fahrenheit to eighty degrees Fahrenheit, compressor 10 may operate within a normal range. When DSH is below thirty degrees Fahrenheit, the onset of a flood back condition may be occur. When DSH is below ten degrees Fahrenheit, a severe flood back condition may occur.

With respect to overheating, when DSH is greater than eighty degrees Fahrenheit, the onset of an overheating condition may occur. When DSH is greater than one-hundred degrees Fahrenheit, a severe overheating condition may be present.

In FIG. 5, typical SSH temperatures for exemplar refrigerant charge levels are shown. For example, as the percentage of refrigerant charge in refrigeration system 5 decreases, SSH typically increases.

Figure 4:
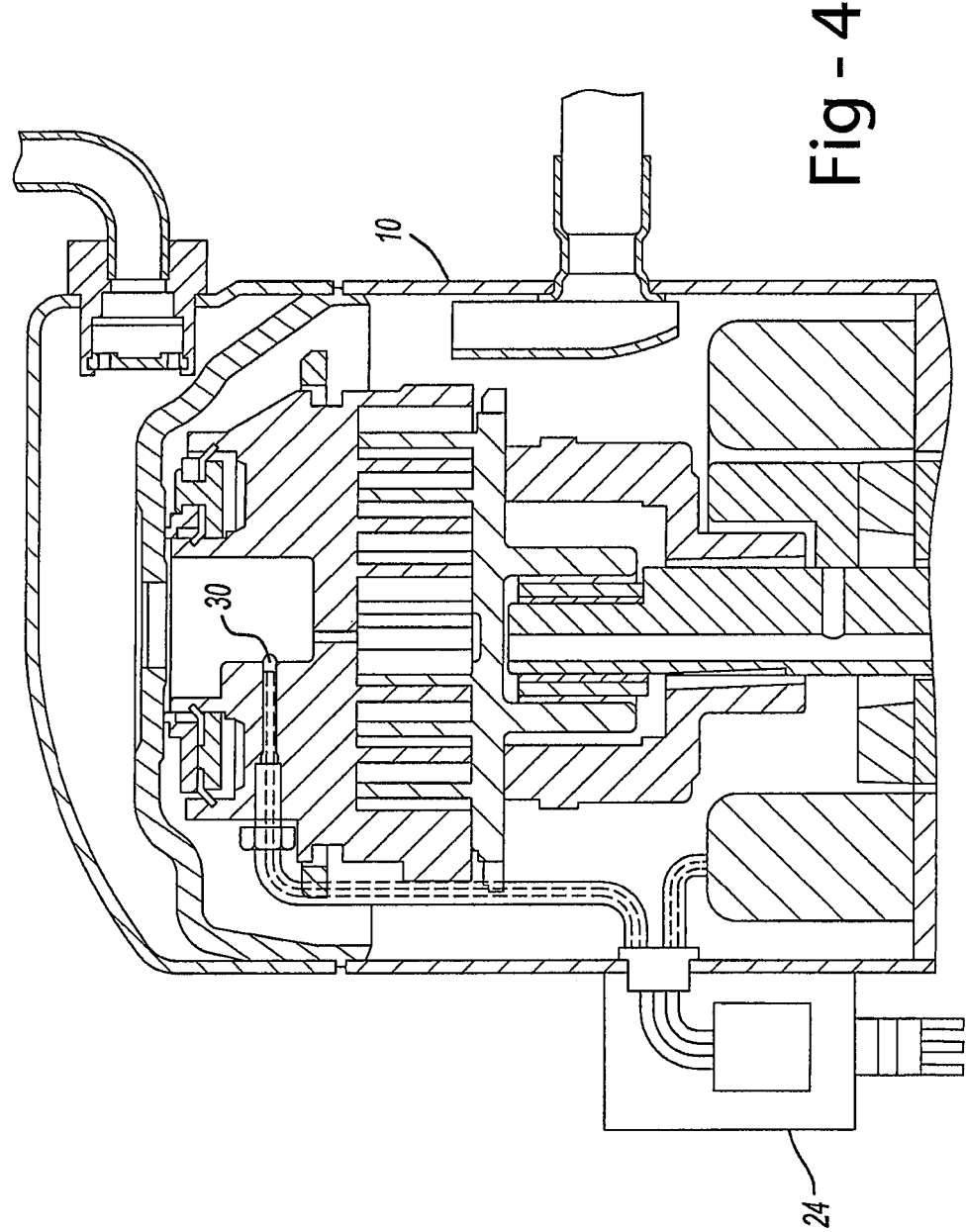
FIG. 4 is a cross-section view of a compressor.

To determine DSH, DLT may be subtracted from Tcond. DLT may be sensed by a DLT sensor 28 that senses a temperature of refrigerant exiting compressor 10. As shown in FIG. 1, DLT sensor 28 may be external to compressor 10 and may be mounted proximate a discharge outlet of compressor 10. Alternatively, an internal DLT sensor 30 may be used as shown in FIG. 4. In FIG. 4, a cross-section of compressor 10 is shown. Internal DLT sensor 30 may be embedded in an upper fixed scroll of a scroll compressor and may sense a temperature of discharge refrigerant exiting the intermeshing scrolls.

In the alternative, a combination temperature/pressure sensor may be used. In such case, Tcond may be measured based on the pressure of refrigerant exiting compressor 10 as measured by the combination sensor. Moreover, in such case, DSH may be calculated based on DLT, as measured by the temperature portion of the sensor, and on Tcond, as measured by the pressure portion of the combination sensor.

Tcond may be derived from other system parameters. Specifically, Tcond may be derived from compressor current and voltage (i.e., compressor power), compressor speed, and compressor map data associated with compressor 10. A method for deriving Tcond based on current, voltage and compressor map data for a fixed speed compressor is described in the commonly assigned application for Compressor Diagnostic and Protection System, U.S. application Ser. No. 11/059,646, Publication No. U.S. 2005/0235660. Compressor map data for a fixed speed compressor correlating compressor current and voltage to Tcond may be compressor specific and based on test data for a specific compressor type, model and capacity.

In the case of a variable speed compressor, Tcond may also be a function of compressor speed, in addition to compressor power.

Figure 6:
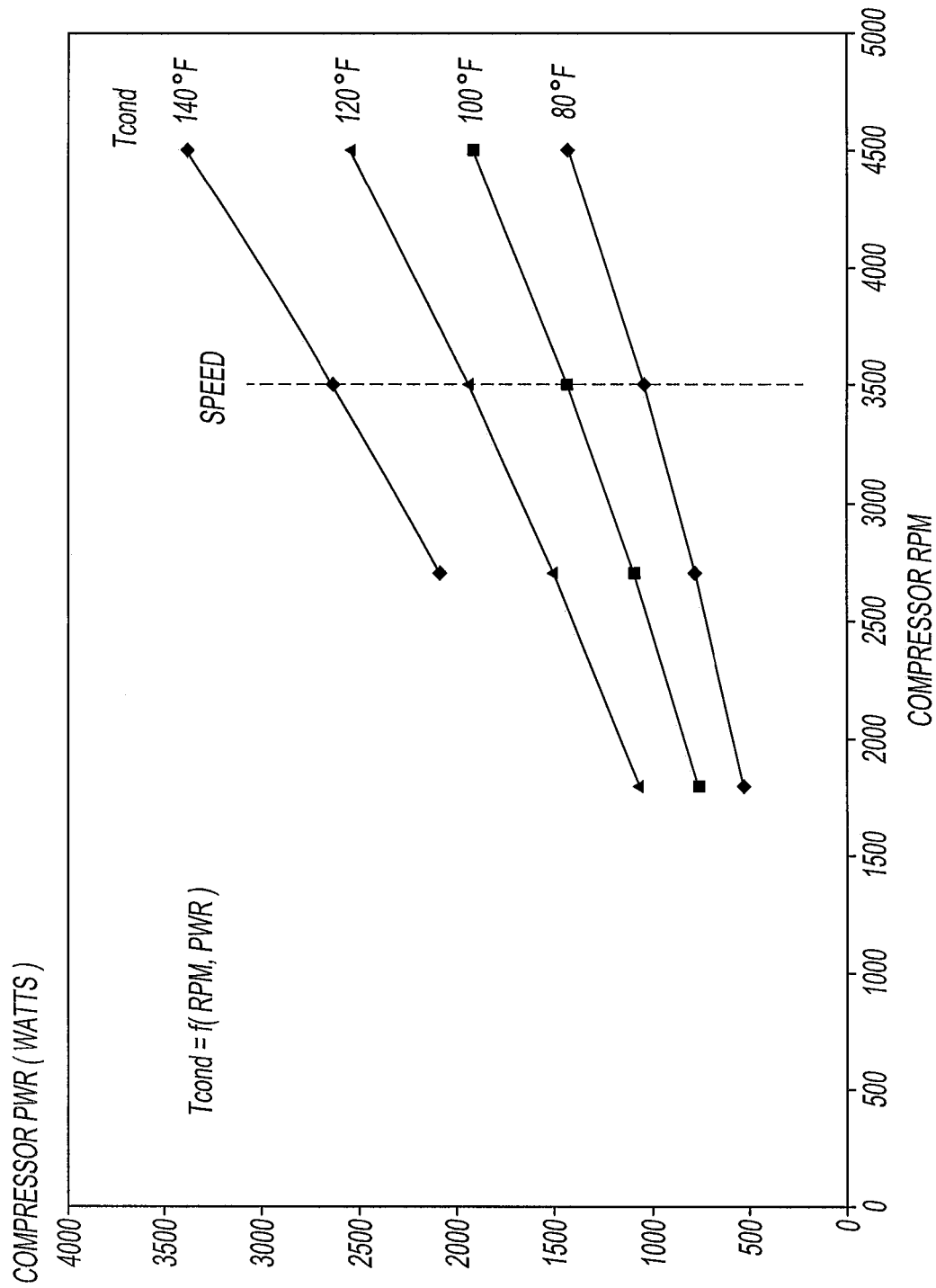
FIG. 6 is a graph showing condenser temperature correlated with compressor power and compressor speed.

A graphical correlation between compressor power in watts and compressor speed is shown in FIG. 6. As shown, Tcond is a function of compressor power and compressor speed. In this way, a three-dimensional compressor map with data correlating compressor power, compressor speed, and Tcond may be derived for a specific compressor based on test data. Compressor current may be used instead of compressor power. Compressor power, however, may be preferred over compressor current to reduce the impact of any line voltage variation. The compressor map may be stored in a computer readable medium accessible to control module 25.

In this way, control module 25 may calculate Tcond based on compressor power data and compressor speed data. Control module 25 may calculate, monitor, or detect compressor power data during the calculations performed to convert electrical power from power supply 18 to electrical power at a desired frequency. In this way, compressor power and current data may be readily available to control module 25. In addition, control module 25 may calculate, monitor, or detect compressor speed based on the frequency of electrical power delivered to the electric motor of compressor 10. In this way, compressor speed data may also be readily available to control module 25. Based on compressor power and compressor speed, control module 25 may derive Tcond.

After measuring or calculating Tcond, control module 25 may calculate DSH as the difference between Tcond and DLT, with DLT data being receiving from external DLT sensor 28 or internal DLT sensor 30.

Control module 25 may monitor DSH to detect a flood back or overheat condition, based on the correlation between DSH and flood back and overheat conditions described above. Upon detection of a flood back or overheat condition, control module 25 may adjust compressor speed or adjust expansion valve 14 accordingly. Control module 25 may communicate with or control expansion valve 14. Alternatively, control module 25 may communicate with a system controller for refrigeration system 5 and may notify system controller of the flood back or overheat condition. System controller may then adjust expansion valve or compressor speed accordingly.

DSH may be monitored to detect or predict a sudden flood back or overheat condition. A sudden reduction in DLT or DSH without significant accompanying change in Tcond may be indicative of a sudden flood back or overheat condition. For example, if DLT or DSH decreases by a predetermined temperature amount (e.g., fifty degrees Fahrenheit) within a predetermined time period (e.g., fifty seconds), a sudden flood back condition may exist. Such a condition may be caused by expansion valve 14 being stuck open. Likewise, a sudden increase in DLT or DSH with similar magnitude and without significant accompanying change in Tcond may be indicative of a sudden overheat condition due to expansion valve 14 being stuck closed. For example, if DLT or DSH increases by a predetermined temperature amount (e.g., fifty degrees Fahrenheit) within a predetermined time period (e.g., fifty seconds), a sudden overheat condition may exist.

Figure 7:
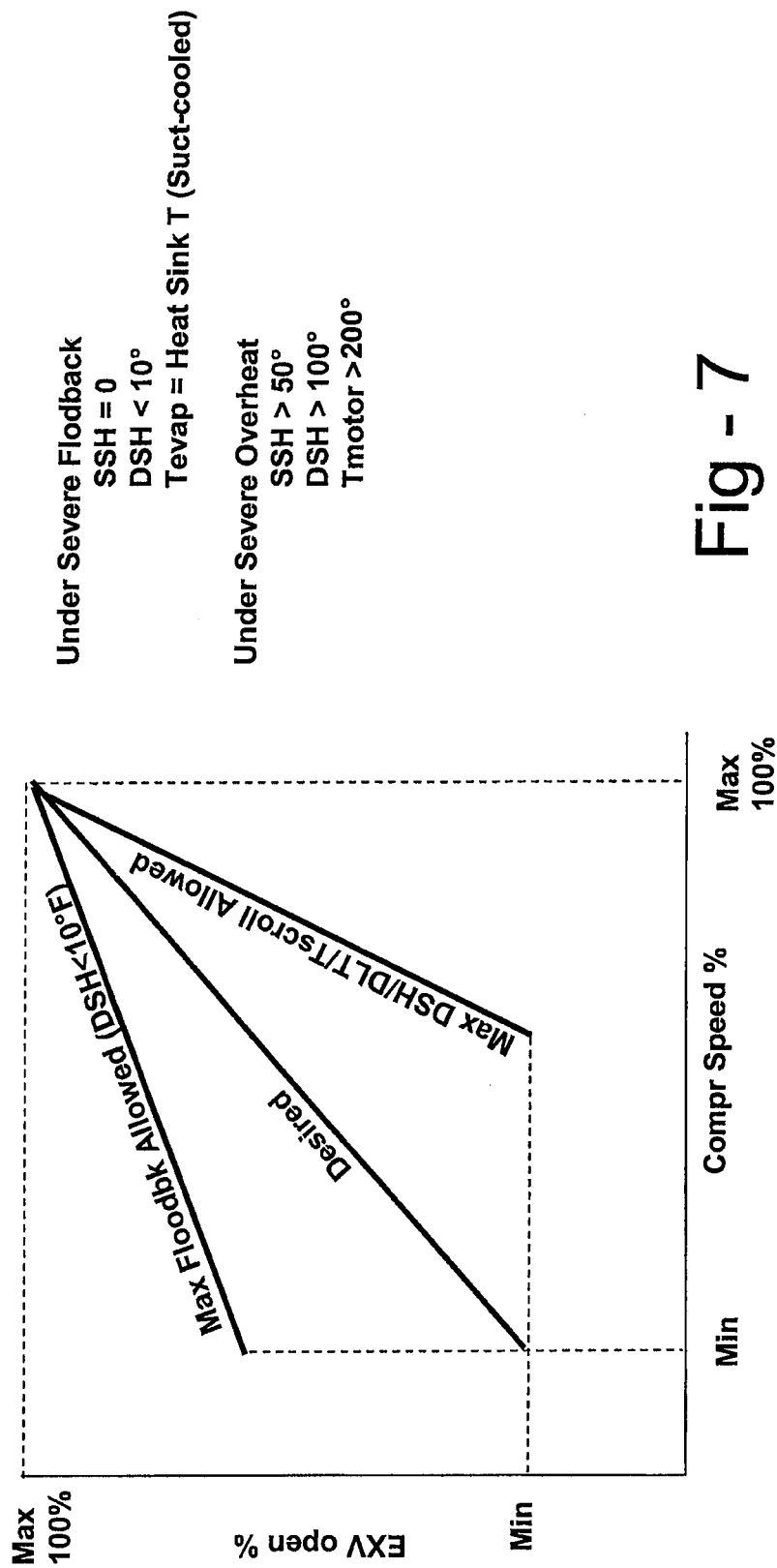
FIG. 7 is a graph showing an operating envelope of a compressor.

Control module 25 may monitor DSH and DLT to determine whether compressor 10 is operating within a predetermined operating envelope. As shown in FIG. 7, a compressor operating envelope may provide maximum flood back and maximum and/or minimum DSH/DLT limits. In addition, a maximum scroll temperature limit (Tscroll) may be provided, in the case of a scroll compressor. In addition, a maximum motor temperature (Tmotor) may be provided. As shown in FIG. 7, compressor speed and expansion valve 14 may be adjusted based on DSH and/or DLT to insure compressor operation within the compressor operating envelope. In this way, DSH and/or DLT may move back into an acceptable range as indicated by FIG. 7. Compressor speed adjustment may take priority over expansion valve adjustment. In some cases, such as a defrost state, it may be difficult for expansion valve 14 to respond quickly and compressor speed adjustment may be more appropriate.

In the event of a flood back condition, control module 25 may limit a compressor speed range. For example, when DSH is below thirty degrees Fahrenheit, compressor operation may be limited to the compressor's cooling capacity rating speed. For example, the cooling capacity rating speed may be 4500 RPM. When DSH is between thirty degrees Fahrenheit and sixty degrees Fahrenheit, compressor operating speed range may be expanded linearly to the full operating speed range. For example, compressor operating speed range may be between 1800 and 7000 RPM.

Figure 8:
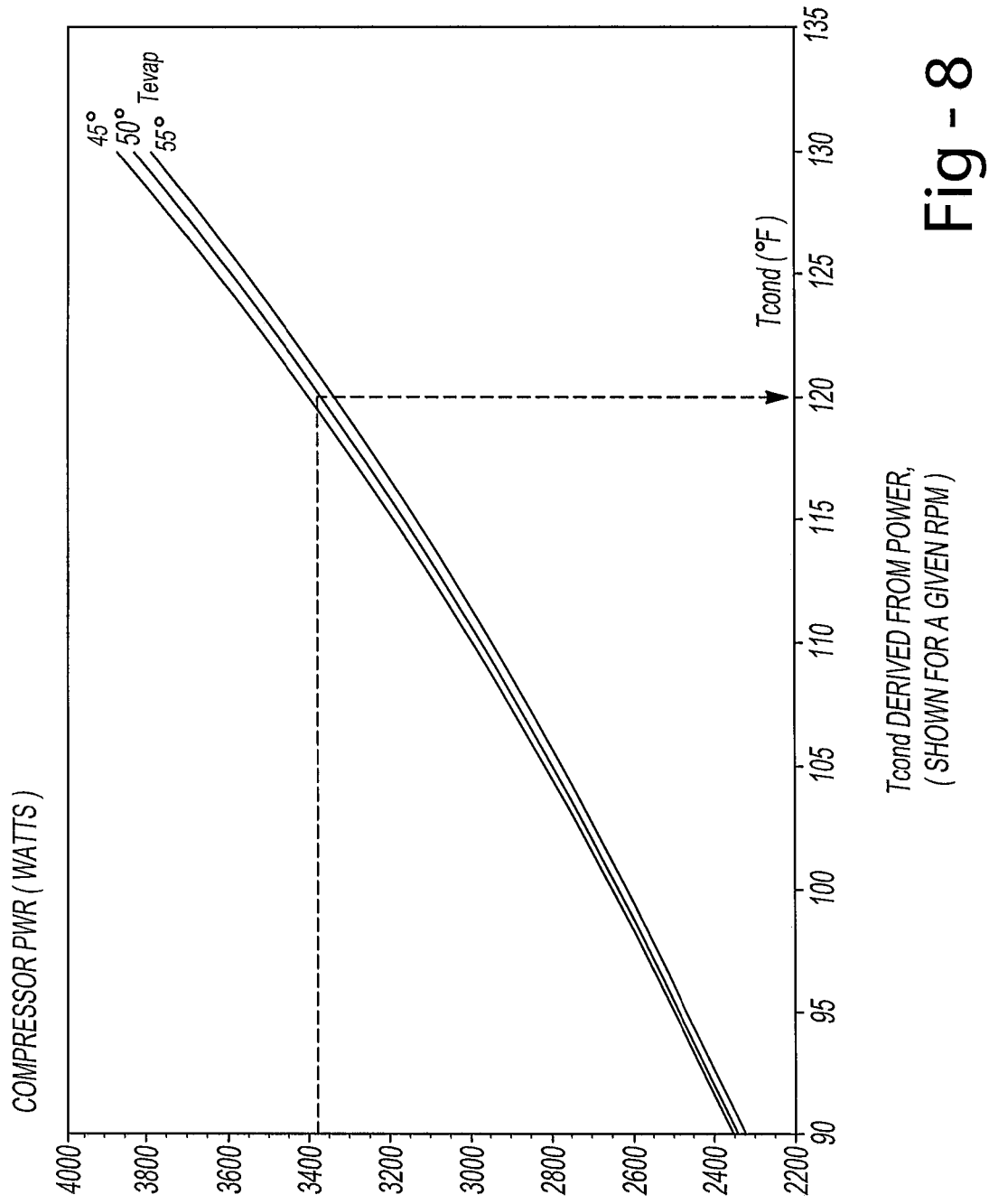
FIG. 8 is a graph showing condensing temperature correlated with evaporator temperature and compressor power for a given compressor speed.

The function correlating Tcond with compressor speed and power, may assume a predetermined or constant saturated Tevap. As shown in FIG. 8, the correlation between compressor power and Tcond may be insensitive to variations of Tevap.

For additional accuracy, Tevap may be derived as a function of Tcond and DLT, as described in commonly assigned U.S. application Ser. No. 11/059,646, U.S. Publication No. 2005/0235660. For variable speed compressors, the correlation may also reflect compressor speed. In this way, Tevap may be derived as a function of Tcond, DLT and compressor speed.

Figure 9:
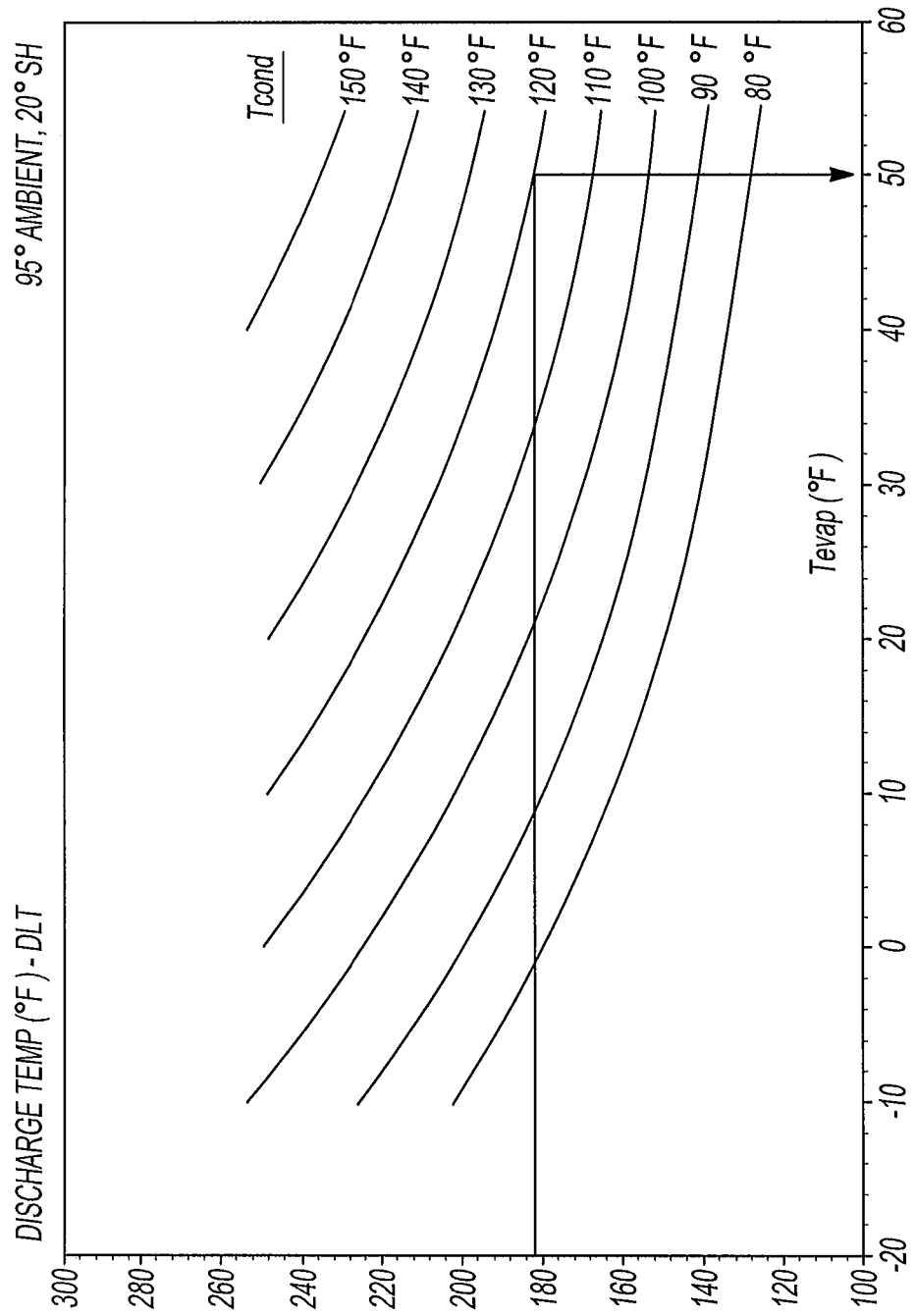
FIG. 9 is a graph showing discharge line temperature correlated with evaporator temperature and condenser temperature.

As shown in FIG. 9, Tevap is shown correlated with DLT, for various Tcond levels. For this reason, compressor map data for different speeds may be used.

Tcond and Tevap may be calculated based on a single derivation.

In addition, iterative calculations may be made based on the following equations:

$$Tcond = f(\text{compressor power, compressor speed, } Tevap) \quad \text{Equation 1}$$

$$Tevap = f(Tcond, DLT, \text{compressor speed}) \quad \text{Equation 2}$$

Multiple iterations of these equations may be performed to achieve convergence. For example, three iterations may provide optimal convergence. As discussed above, more or less iteration, or no iterations, may be used.

Tevap and Tcond may also be determined by using compressor map data, for different speeds, based on DLT and compressor power, based on the following equations:

$$Tevap = f(\text{compressor power, compressor speed, } DLT) \quad \text{Equation 3}$$

$$Tcond = f(\text{compressor power, compressor speed, } DLT) \quad \text{Equation 4}$$

Once Tevap and Tcond are known, additional compressor performance parameters may be derived. For example, compressor capacity and compressor efficiency may be derived based on additional compressor performance map data for a specific compressor model and capacity. Such additional compressor map data may be derived from test data. For example, compressor mass flow or capacity, may be derived according to the following equation:

$$Tevap = f(\text{compressor speed, } Tcond, \text{mass flow}) \quad \text{Equation 5}$$

Mass flow may be derived according to the following equation:

$$\begin{aligned}\text{Mass Flow} = {} & m0 + m1*Tevap + \\ & m2*Tcond + m3*RPM + m4*Tevap*Tcond + \\ & m5*Tevap*RPM + m6*Tcond*RPM + \\ & m7*Tevap^{\wedge}2 + m8*Tcond^{\wedge}2 + m9*RPM^{\wedge}2 + \\ & m10*Tevap*Tcond*RPM + m11*Tevap^{\wedge}2*Tcond + \\ & m12*Tevap^{\wedge}2*RPM + m13*Tevap^{\wedge}3 + \\ & m14*Tevap*Tcond^{\wedge}2 + m15*Tcond^{\wedge}2*RPM + \\ & m16*Tcond^{\wedge}3 + m17*Tevap*RPM^{\wedge}2 + \\ & m18*Tcond*RPM^{\wedge}2 + m19*RPM^{\wedge}3\end{aligned} \quad \text{Equation 6}$$

where m0-m19 are compressor model and size specific, as published by compressor manufacturers.

Compressor map data may be stored within a computer readable medium within control module 25 or accessible to control module 25.

Figure 10:
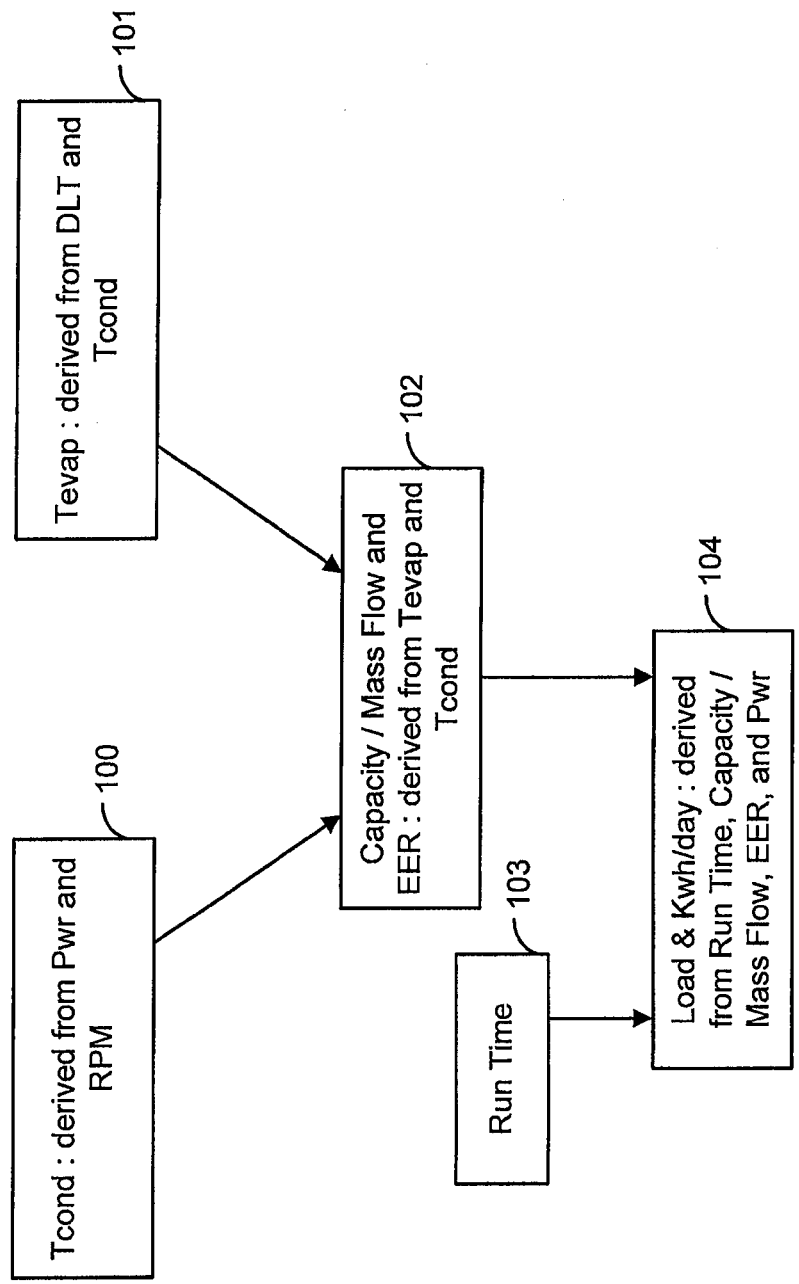
FIG. 10 is a flow chart showing derived data for a refrigeration system.

As shown in FIG. 10, a flow chart for derived parameters is shown. In step 100, Tcond may be derived from compressor power and compressor speed. In step 101, Tevap may be derived from DLT and Tcond. In step 102, capacity/mass flow and a compressor energy efficiency ratio may be derived from Tevap and Tcond. In addition, by monitoring run time in step 103, additional parameters may be derived. Specifically, in step 104, load and Kwh/Day may be derived from run time, capacity/mass flow, EER, and compressor power.

By monitoring the above operating parameters, control module 25 may insure that compressor 10 is operating within acceptable operating envelope limits that are preset by a particular compressor designer or manufacturer and may detect and predict certain undesirable operating conditions, such as compressor floodback and overheat conditions. Further, control module 25 may derive other useful data related to compressor efficiency, power consumption, etc.

Where compressor 10 is driven by a suction cooled inverter drive 22, Tevap may be alternatively calculated. Because Tevap may be calculated from mass flow, Tcond, and compressor speed as discussed above, control module 25 may derive mass flow from a difference in temperature between suction gas entering cold plate 15 (Ts) and a temperature of a heat sink (Ti) located on or near inverter drive 22. Control module 25 may calculate delta T according to the following equation:

$$\text{delta } T = Ts - Ti \quad \text{Equation 7}$$

Figure 11:
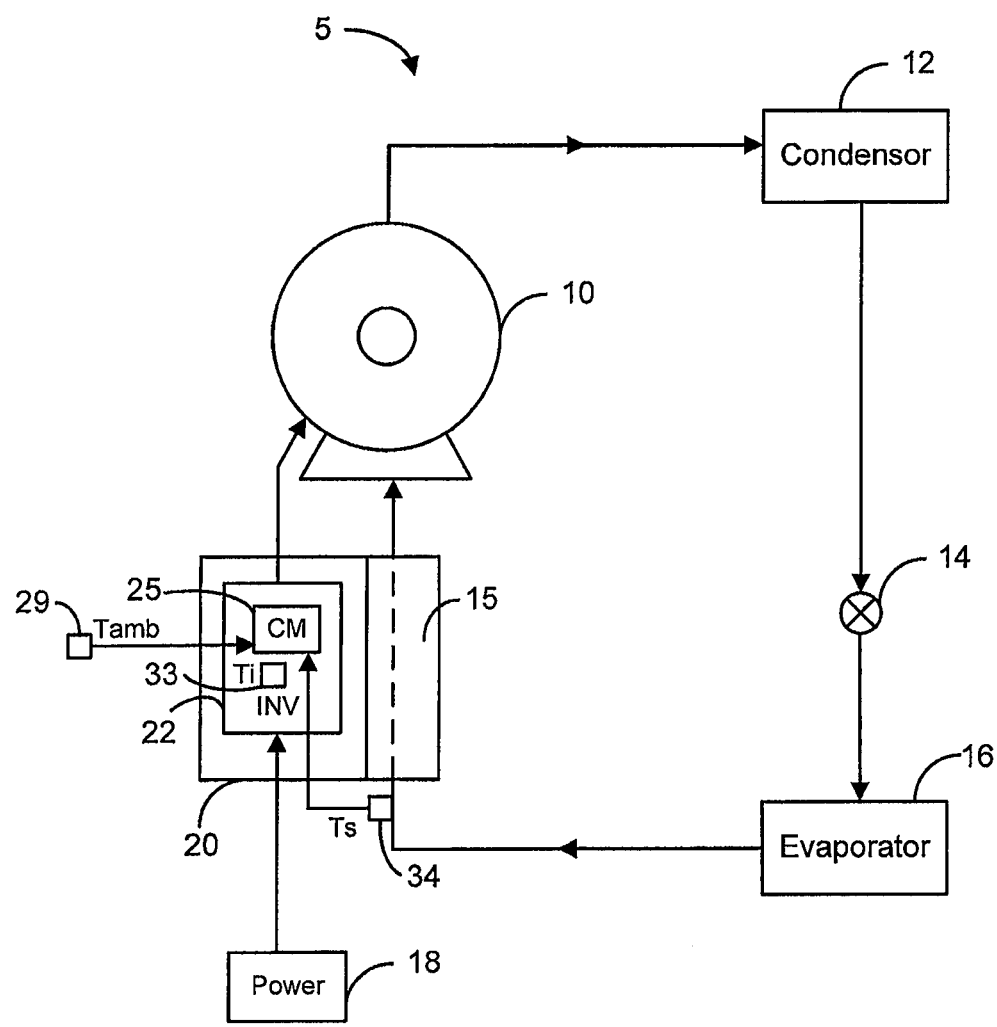
FIG. 11 is a schematic of a refrigeration system.

Ts and Ti may be measured by two temperature sensors 33 and 34 shown in FIG. 11. Temperature sensor 33 measures the temperature of the heat sink (Ti) and may be incorporated as part of inverter drive 22. Alternatively, temperature sensor 33 may measure a temperature of suction gas exiting cold plate 15 and may be located on or near the piping between cold plate 15 and compressor 10. Temperature sensor 34 measures the temperature of suction gas entering cold plate 15.

Figure 12:
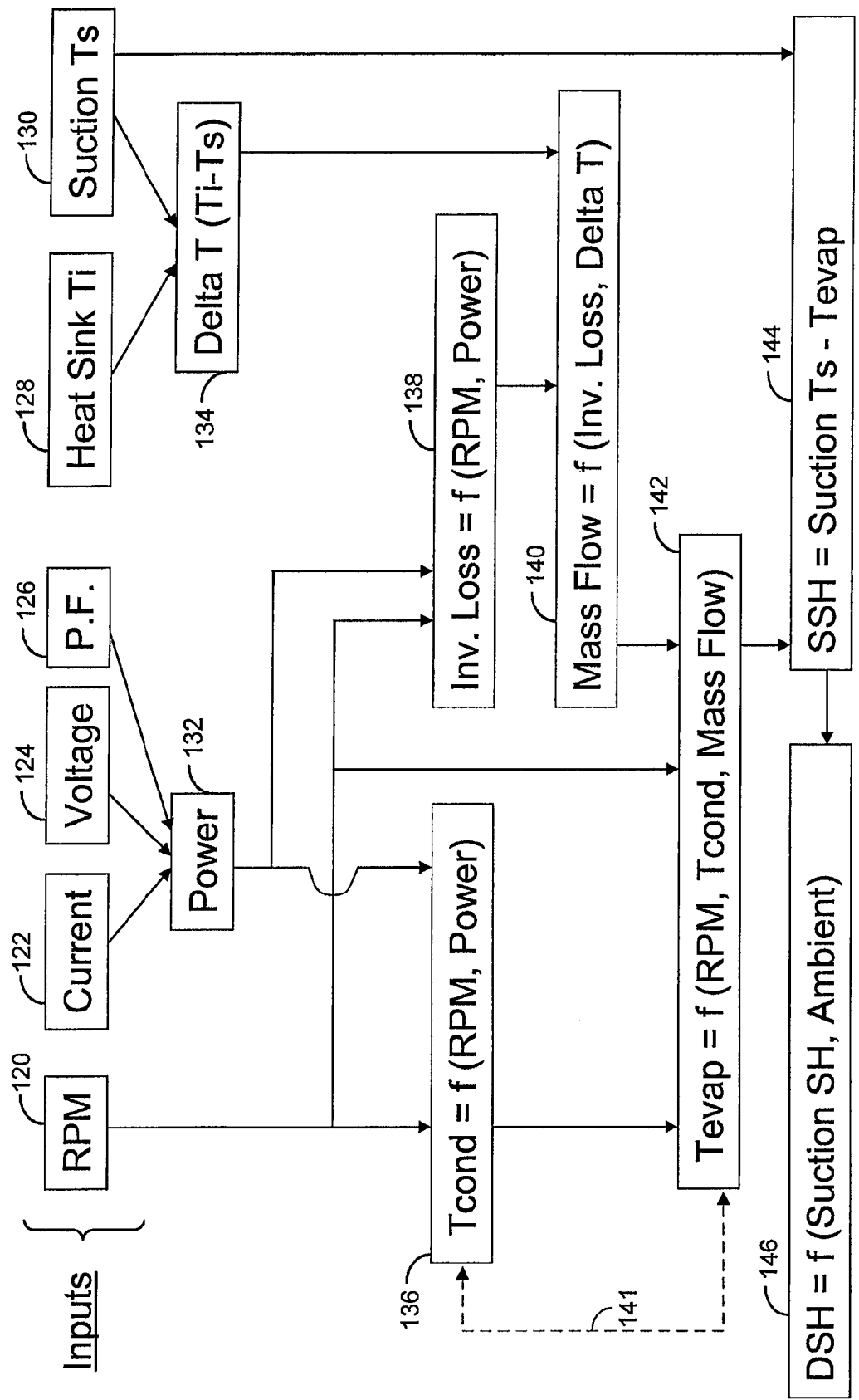
FIG. 12 is a flow chart showing derived data for a refrigeration system.
Figure 13:
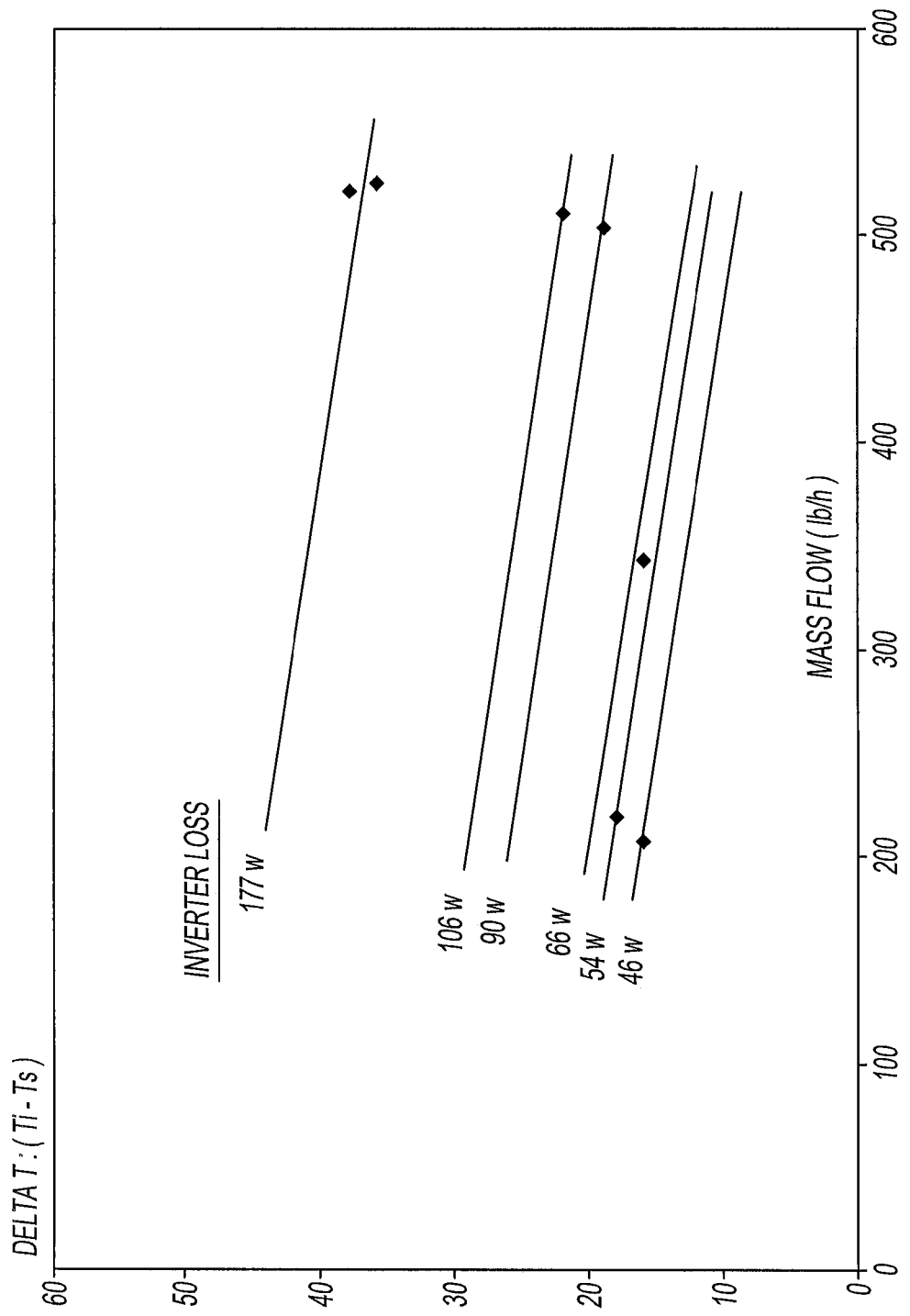
FIG. 13 is a graph showing mass flow correlated with inverter drive heat loss.

Control module 25 may determine mass flow based on delta T and by determining the applied heat of inverter drive 22. As shown in FIG. 12, mass flow may be derived based on lost heat of inverter drive 22 and delta T. As shown in FIG. 13, the relationship between mass flow, delta T and applied inverter heat may be mapped based on test data.

Figure 14:
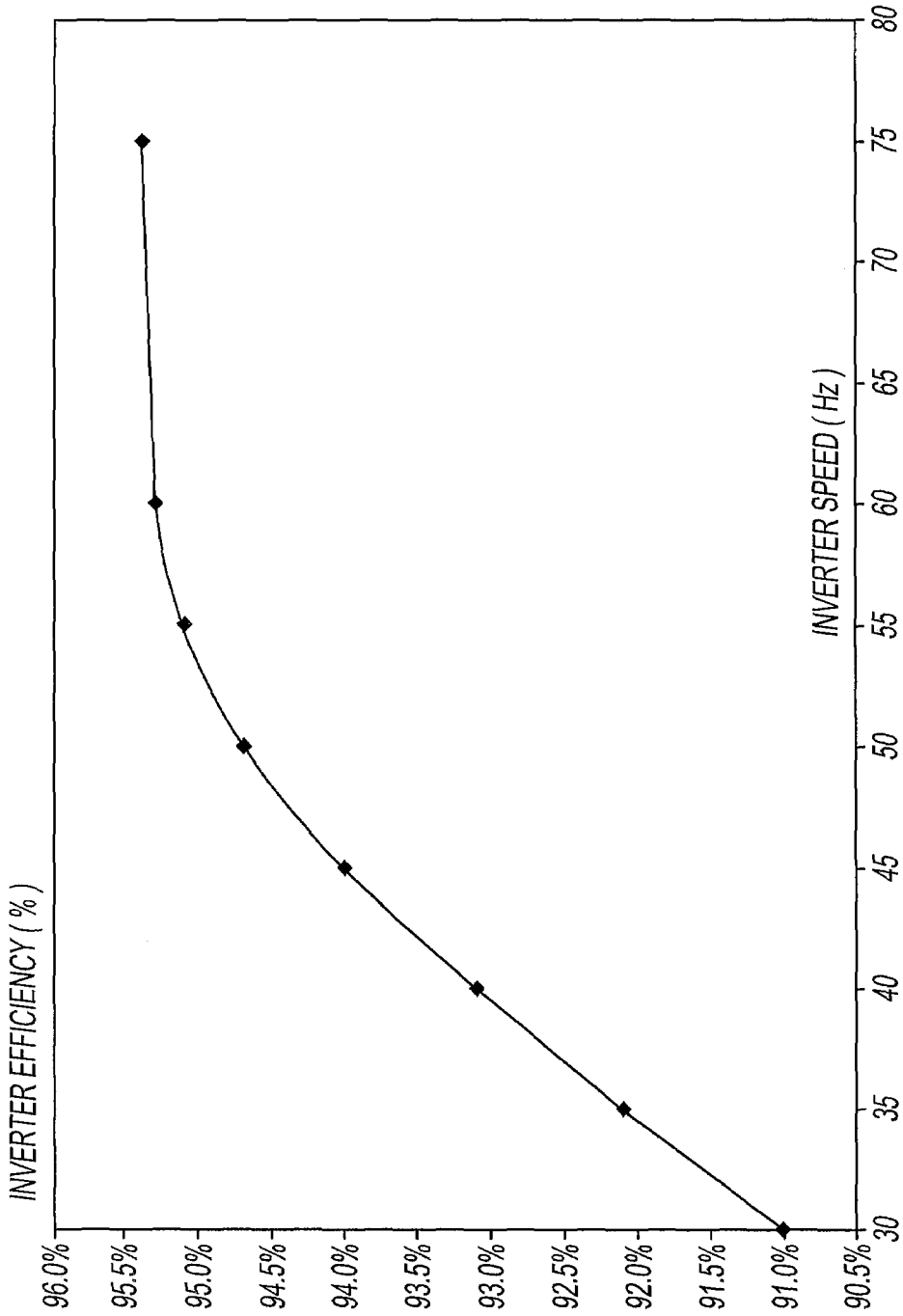
FIG. 14 is a graph showing inverter speed correlated with inverter efficiency.

Inverter heat may be derived based on inverter speed (i.e., compressor speed) and inverter efficiency as shown in FIG. 14.

With reference again to FIG. 12, inputs include compressor speed (RPM) 120, compressor current 122, compressor voltage 124, compressor power factor 126, Ti 128 and Ts 130. From compressor current 122, compressor voltage 124, and power factor 126, compressor power 132 is derived. From temperatures Ti 128 and Ts 130, delta T 134 is derived. From RPM 120 and power, Tcond 136 is derived. Also from RPM 120 and power 132, inverter heat loss 138 is derived. From inverter heat loss, and delta T 134, mass flow 140 is derived. From RPM 120, Tcond 136, and mass flow 140, Tevap 142 is derived. From Tevap 142 and Ts 130, SSH 144 is derived. From SSH 144 and ambient temperature as sensed by ambient temperature sensor 29, DSH 146 is derived. Once DSH 146 is derived, all of the benefits of the algorithms described above may be gained, including protection of compressor 10 from flood back and overheat conditions.

As shown by dotted line 141, Tcond and Tevap may be iteratively calculated to more accurately derive Tcond and Tevap. For example, optimal convergence may be achieved with three iterations. More or less iterations may also be used.

Figure 15:
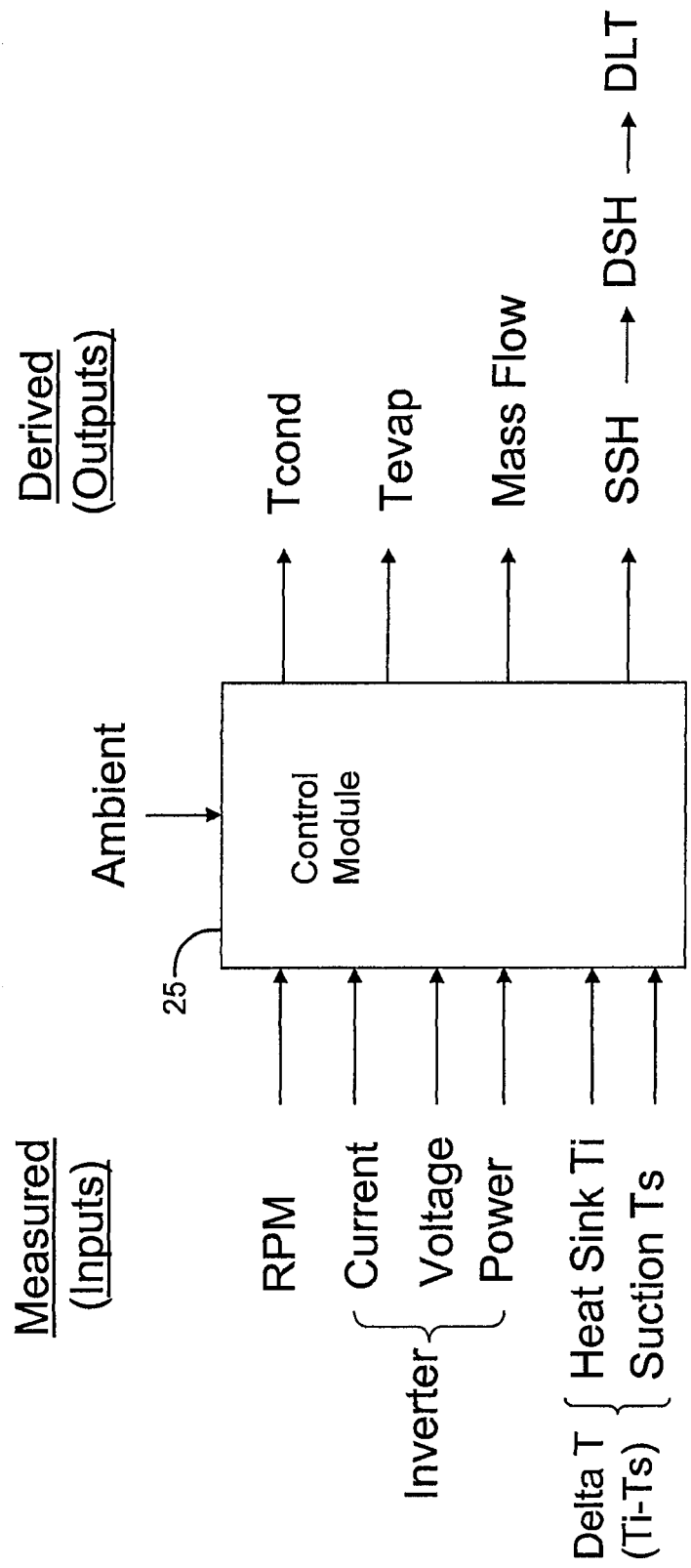
FIG. 15 is a graph showing a control module with measured inputs and derived outputs.

As shown in FIG. 15, control module 25 takes as measured inputs compressor speed RPM, inverter drive current, voltage, and power, and heat sink temperatures Ti and Ts. Control module also takes as input ambient temperature as indicated by ambient temperature sensor 29. As discussed above, control module 25 derives from these measured inputs the outputs of Tcond, Tevap, mass flow, SSH, DSH, and DLT.

Figure 16:
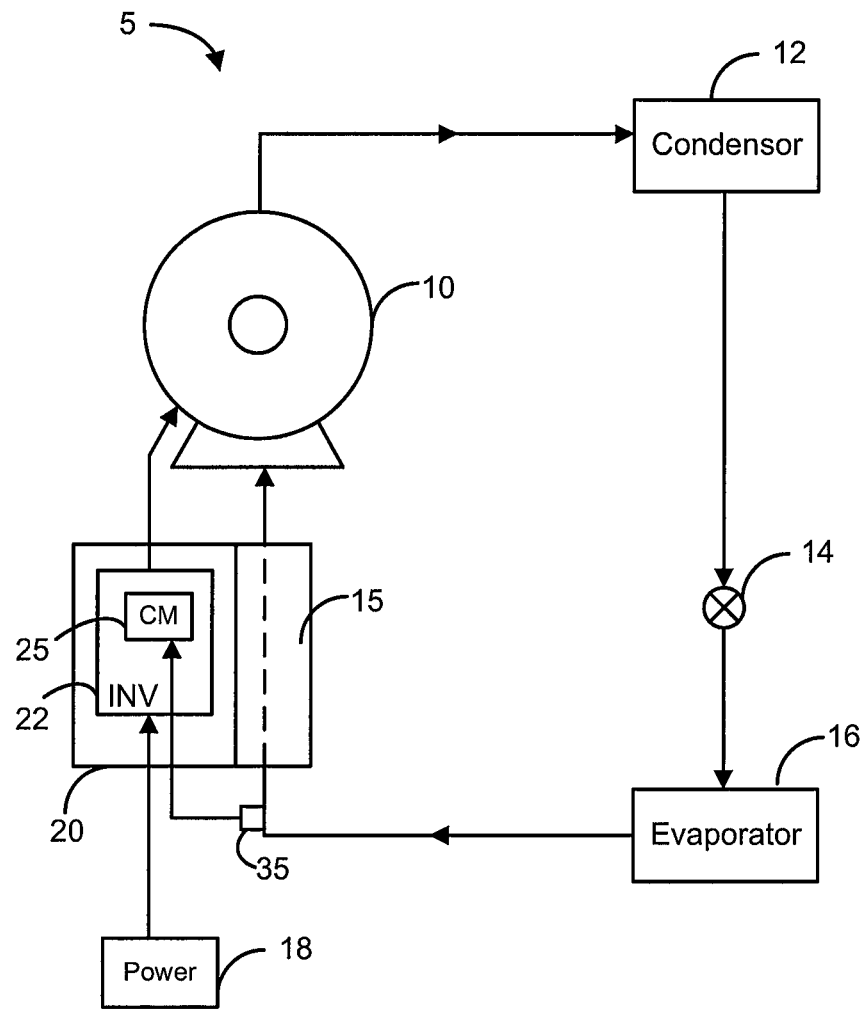
FIG. 16 is a schematic of a refrigeration system.

As shown in FIG. 16, control module 25 may monitor SLT with SLT sensor 35, which may include a combination pressure and temperature sensor may be used. In such case, Tevap may be measured based on the suction pressure as measured by the pressure portion of the combination sensor. Further, SSH may be calculated based on SLT, as measured by the temperature portion of the combination sensor, and Tevap. SLT sensor 34, 35 may be located at an inlet to compressor 10 and may sense a temperature or pressure of refrigerant entering compressor 10 subsequent to inverter 22, enclosure 20, or cold plate 15. Alternatively SLT sensor may be located at an inlet to enclosure 20, inverter 22, or cold plate 15 and may sense a temperature or pressure of refrigerant entering the enclosure 20, inverter 22, or cold plate 15.

In addition, similar to the calculation of DSH based on DLT described above, control module 25 may also calculate SSH. For example, compressor power, compressor speed, and compressor map data may be used to derive Tcond and Tevap may be derived from Tcond. Once Tevap is derived, SSH may be derived from SLT and Tevap and used as described above for monitoring various compressor operating parameters and protecting against flood back and overheat conditions.

What is claimed is:

1. A system comprising:
    a compressor connected to an evaporator;
    a suction temperature sensor that outputs a suction temperature signal corresponding to a temperature of refrigerant entering said compressor;
    an inverter drive connected to said compressor that receives electric power and modulates a speed of said compressor by modulating a frequency of said electric power;
    a heat sink temperature sensor that outputs a heat sink temperature signal corresponding to a temperature of a heat sink associated with said inverter;
    a control module connected to said inverter drive that receives said suction temperature signal, that monitors compressor power data and compressor speed data from said inverter drive, that calculates a saturated evaporator temperature of a refrigeration system associated with said compressor and said evaporator based on said suction temperature signal, said heat sink temperature signal, said compressor power data, and said compressor speed data; and that generates at least one of a control signal and a notification signal based on said calculated saturated evaporator temperature.

2. The system of claim 1 wherein said suction temperature sensor is located at an inlet of said compressor.

3. The system of claim 1 wherein said suction temperature sensor is located at an inlet of a cold plate of said inverter drive.

4. The system of claim 1 wherein said control module calculates an inverter heat loss based on said compressor speed data and said compressor power data.

5. The system of claim 4 wherein said control module calculates a mass flow of refrigerant in said refrigeration system based on said inverter heat loss, said suction temperature signal, and said heat sink temperature signal.

6. The system of claim 5 wherein said control module calculates said saturated evaporator temperature based on said compressor power data, said compressor speed data, and said mass flow.

7. The system of claim 6 wherein said control module calculates a suction superheat temperature based on said suction temperature signal and said saturated evaporator temperature.

8. The system of claim 7 wherein said control module monitors at least one of an overheat condition and a flood back condition of said compressor based on said calculated suction superheat temperature.

9. The system of claim 7 further comprising an ambient temperature sensor that outputs an ambient temperature signal corresponding to an ambient temperature, wherein said control module receives said ambient temperature signal and calculates a discharge superheat based on said ambient temperature signal and said calculated suction superheat temperature.

10. A method comprising
    receiving a suction temperature signal from a suction temperature sensor, said suction temperature signal corresponding to a temperature of refrigerant entering a compressor, said compressor being connected to an evaporator;
    delivering electric power to said compressor with an inverter drive configured to modulate a speed of said compressor by modulating a frequency of said electric power;
    receiving a heat sink temperature signal from a heat sink temperature sensor, said heat sink temperature signal corresponding to a temperature of a heat sink associated with said inverter;
    monitoring compressor power data and compressor speed data from said inverter drive;
    calculating a saturated evaporator temperature of a refrigeration system associated with said compressor and said evaporator based on said suction temperature signal, said heat sink temperature signal, said compressor power data, and said compressor speed data;
    generating at least one of a control signal and a notification signal based on said calculated saturated evaporator temperature.

11. The method of claim 10 further comprising calculating an inverter heat loss based on said compressor speed data and said compressor power data.

12. The method of claim 11 further comprising calculating a mass flow of refrigerant in said refrigeration system based on said inverter heat loss, said suction temperature signal, and said heat sink temperature signal.

13. The method of claim 12 further comprising calculating said saturated evaporator temperature based on said compressor power data, said compressor speed data, and said mass flow.

14. The method of claim 13 further comprising calculating a suction superheat temperature based on said suction temperature signal and said saturated evaporator temperature.

15. The method of claim 14 further comprising monitoring at least one of an overheat condition and a flood back condition of said compressor based on said calculated suction superheat temperature.

16. The method of claim 14 further comprising receiving an ambient temperature signal from an ambient temperature sensor, said ambient temperature signal corresponding to an ambient temperature and calculating a discharge superheat based on said ambient temperature signal and said calculated suction superheat temperature.

* * * * *

UNITED STATES PATENT AND TRADEMARK OFFICE
CERTIFICATE OF CORRECTION

Page 1 of 2

PATENT NO. : 8,459,053 B2
APPLICATION NO. : 12/246959
DATED : June 11, 2013
INVENTOR(S) : Hung M. Pham et al.

It is certified that error appears in the above-identified patent and that said Letters Patent is hereby corrected as shown below:

On the Title Page, Item [56]

| | |
|---|---|
| Page 3, Column 2, Other Publications, Line 12 | After "Chinese", insert --Patent--. |
| Page 3, Column 2, Other Publications, Line 16 | Delete "PCT/US2008/011576" and insert --PCT/US2008/011576,--. |
| Page 3, Column 2, Other Publications, Line 18 | Delete "PCT/US2008/011576" and insert --PCT/US2008/011576,--. |
| Page 3, Column 2, Other Publications, Line 21 | Delete "PCT/US2008/011464" and insert --PCT/US2008/011464,--. |
| Page 3, Column 2, Other Publications, Line 23 | Delete "PCT/US2008/011464" and insert --PCT/US2008/011464,--. |
| Page 3, Column 2, Other Publications, Line 52 | Delete "PCT/US2008/011442" and insert --PCT/US2008/011442,--. |
| Page 3, Column 2, Other Publications, Line 53 | Delete "Applicatoin" and insert --Application--. |
| Page 4, Column 1, Other Publications, Line 68 | After "Korean", insert --Patent--. |

Signed and Sealed this
Twenty-fifth Day of March, 2014

Michelle K. Lee
*Deputy Director of the United States Patent and Trademark Office*

CERTIFICATE OF CORRECTION (continued)
U.S. Pat. No. 8,459,053 B2

| | |
|---|---|
| Page 4, Column 2, | |
| Other Publications, Line 17 | Delete "200880111091.9" and insert --200880111091.9,--. |
| | |
| Page 4, Column 2, | |
| Other Publications, Line 48 | After "Chinese", insert --Patent--. |

In the Drawings

| | |
|---|---|
| Drawing Sheet 1 of 17, | |
| Reference Numeral 12, Fig. 1 | Delete "Condensor" and insert --Condenser--. |
| Drawing Sheet 7 of 17, Fig. 7 | Delete "Flodback" and insert --Floodback--. |
| Drawing Sheet 11 of 17, | |
| Reference Numeral 12, Fig. 11 | Delete "Condensor" and insert --Condenser--. |
| Drawing Sheet 16 of 17, | |
| Reference Numeral 12, Fig. 16 | Delete "Condensor" and insert --Condenser--. |

In the Claims

| | |
|---|---|
| Column 12, Line 22 | Claim 10, after "comprising", insert --:--. |
| Column 12, Line 42 | Claim 10, after "data", insert --and--. |